(12) United States Patent
Sasaki et al.

(10) Patent No.: US 11,380,353 B1
(45) Date of Patent: Jul. 5, 2022

(54) MAGNETIC HEAD INCLUDING SPIN TORQUE OSCILLATOR, FIRST AND SECOND GAP FILMS, AND FIRST AND SECOND GUARD FILMS, AND MANUFACTURING METHOD FOR THE SAME

(71) Applicants: Yoshitaka Sasaki, Los Gatos, CA (US); Shigeki Tanemura, Milpitas, CA (US); Kazuki Sato, Milpitas, CA (US); Yoji Nomura, Milpitas, CA (US); Hironori Araki, Milpitas, CA (US); Tetsuhito Shinohara, Milpitas, CA (US)

(72) Inventors: Yoshitaka Sasaki, Los Gatos, CA (US); Shigeki Tanemura, Milpitas, CA (US); Kazuki Sato, Milpitas, CA (US); Yoji Nomura, Milpitas, CA (US); Hironori Araki, Milpitas, CA (US); Tetsuhito Shinohara, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 17/313,417

(22) Filed: May 6, 2021

(51) Int. Cl.
*G11B 5/235* (2006.01)
*G11B 5/127* (2006.01)
*G11B 5/31* (2006.01)
*G11B 5/39* (2006.01)
*G11B 5/00* (2006.01)

(52) U.S. Cl.
CPC ............ *G11B 5/235* (2013.01); *G11B 5/1278* (2013.01); *G11B 5/314* (2013.01); *G11B 5/315* (2013.01); *G11B 5/3146* (2013.01); *G11B 5/3912* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 8,320,079 B2 | 11/2012 | Iwasaki et al. | |
| 8,917,481 B2 | 12/2014 | Kusukawa et al. | |
| 10,032,470 B1 | 7/2018 | Degawa et al. | |
| 10,109,302 B1 | 10/2018 | Shinohara et al. | |
| 10,748,559 B1 | 8/2020 | Araki et al. | |
| 11,170,803 B1 * | 11/2021 | Liu et al. ............... | G11B 5/235 |
| 2015/0109699 A1 * | 4/2015 | Boone et al. ......... | G11B 5/3146 360/125.32 |
| 2018/0075868 A1 | 3/2018 | Koui et al. | |
| 2019/0279662 A1 * | 9/2019 | Liu et al. ............. | G11B 5/1278 |

* cited by examiner

*Primary Examiner* — Craig A. Renner
(74) *Attorney, Agent, or Firm* — Oliff PLC

(57) ABSTRACT

A magnetic head includes a main pole, a trailing shield, a spin torque oscillator, first and second side shields, first and second gap films, and first and second guard films. The first gap film and the first guard film are interposed between the trailing shield and the first side shield. The second gap film and the second guard film are interposed between the trailing shield and the second side shield.

8 Claims, 23 Drawing Sheets

MAGNETIC HEAD INCLUDING SPIN TORQUE OSCILLATOR, FIRST AND SECOND GAP FILMS, AND FIRST AND SECOND GUARD FILMS, AND MANUFACTURING METHOD FOR THE SAME

BACKGROUND OF THE INVENTION

1. Field of the Invention

The present invention relates to a magnetic head including a spin torque oscillator, and a manufacturing method for the same.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is less likely to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a magnetic path forming section. The coil generates a magnetic field corresponding to data to be written on the recording medium. The magnetic path forming section is made of a magnetic material and forms a magnetic path for passing a magnetic flux corresponding to the magnetic field generated by the coil.

The magnetic path forming section includes, for example, a main pole, a trailing shield, a first side shield, a second side shield, and a return path section. The main pole has a first end face located in a medium facing surface configured to face a recording medium. The trailing shield has a second end face located in the medium facing surface at a position forward relative to the first end face in a direction of travel of the recording medium. The return path section magnetically connects part of the main pole away from the medium facing surface to the trailing shield. The main pole generates, from the first end face, a write magnetic field for writing data on the recording medium.

The first and second side shields are opposed to each other in a track width direction with the main pole therebetween. The first side shield has a third end face located in the medium facing surface. The second side shield has a fourth end face located in the medium facing surface. The third and fourth end faces are opposed to each other in the track width direction with the first end face therebetween. The third and fourth end faces are located backward relative to the second end face in the direction of travel of the recording medium.

Recently, the use of what is called a spin torque oscillator in a magnetic head has been proposed as a method for increasing the recording density of a magnetic disk drive. U.S. Pat. Nos. 8,320,079 B2, 8,917,481 B2, 10,032,470 B1, and 10,109,302 B1 each disclose a technology of using a spin torque oscillator that generates a microwave magnetic field. According to the technology, a microwave magnetic field is generated by the spin torque oscillator, and the microwave magnetic field and the write magnetic field are simultaneously applied to a portion of the recording medium on which data is to be written. To increase the recording density, it is effective to increase the coercivity of the recording medium by making magnetic fine particles of the recording medium smaller and, at the same time, enhancing the anisotropic energy of the magnetic fine particles. The aforementioned technology enables data writing with the coercivity of the recording medium lowered by microwaves, thus enabling use of a recording medium having high coercivity.

U.S. Patent Application Publication No. 2018/0075868 A1 discloses a technology of using a spin torque oscillator that adjusts magnetic permeability. The spin torque oscillator blocks magnetic flux leaking from the main pole to the trailing shield. The technology makes it possible to make a gap between the main pole and the shield smaller. This in turn makes it possible to steepen the gradient of change in the strength of the write magnetic field to thereby increase the recording density.

In both of the above-described two technologies, the spin torque oscillator is disposed between the main pole and the trailing shield and electrically connected to the main pole and the trailing shield. A current for operating the spin torque oscillator is supplied via the main pole and the trailing shield. Hereinafter, a surface of the spin torque oscillator to be opposed to the main pole will be referred to as a bottom surface of the spin torque oscillator, and a surface of the spin torque oscillator to be opposed to the trailing shield will be referred to as a top surface of the spin torque oscillator. A surface of the main pole to be opposed to the trailing shield will be referred to as a top surface of the main pole. A surface of the trailing shield to be opposed to the main pole will be referred to as a bottom surface of the trailing shield.

A method of forming a spin torque oscillator will now be discussed. Typically, a spin torque oscillator is formed as follows. A layered film to later become the spin torque oscillator is initially formed on the top surface of the main pole, and then the layered film is patterned by etching so that a plurality of surfaces of the spin torque oscillator other than the top and bottom surfaces are formed in the layered film. Here, a width in the track width direction will be simply referred to as a width. If the layered film is etched, the top surface of the spin torque oscillator is usually formed with a smaller width than that of the bottom surface of the spin torque oscillator. This causes problems including heat generation of the spin torque oscillator and insufficient exertion of the foregoing function of the spin torque oscillator.

To prevent the occurrence of the foregoing problems, it is effective to perpendicularly etch the layered film to increase the width of the top surface of the spin torque oscillator. However, the perpendicular etching of the layered film has conventionally resulted in parts of the first and second side shields being etched as well. For such reasons, it has heretofore been difficult to precisely control the distance between the second end face of the trailing shield and the third end face of the first side shield and the distance between the second end face of the trailing shield and the fourth end face of the second side shield near the spin torque oscillator.

SUMMARY OF THE INVENTION

An object of the present invention is to provide a magnetic head including a spin torque oscillator, where distances between a trailing shield and side shields near the spin torque oscillator can be controlled, and a manufacturing method for the same.

A magnetic head according to the present invention includes: a medium facing surface configured to face a recording medium; a main pole configured to generate a write magnetic field for writing data on the recording medium; a trailing shield formed of a magnetic material and located forward relative to the main pole in a direction of travel of the recording medium; a spin torque oscillator located between the main pole and the trailing shield and electrically connected to the main pole and the trailing shield; first and second side shields formed of a magnetic material and opposed to each other in a track width direction with the main pole between the first and second side shields; first and second gap films formed of a nonmagnetic material and opposed to each other in the track width direction with the spin torque oscillator between the first and second gap films.

The first gap film and the first guard film are interposed between the trailing shield and the first side shield. The second gap film and the second guard film are interposed between the trailing shield and the second side shield.

In the magnetic head according to the present invention, the first and second gap films may be in contact with the spin torque oscillator.

In the magnetic head according to the present invention, the first and second guard films may be not in contact with the spin torque oscillator.

In the magnetic head according to the present invention, the first guard film may be interposed between the first gap film and the first side shield. The second guard film may be interposed between the second gap film and the second side shield.

In the magnetic head according to the present invention, a distance between the trailing shield and the first side shield in the medium facing surface and a distance between the trailing shield and the second side shield in the medium facing surface may each be the same as a distance between the main pole and the trailing shield in the medium facing surface. Alternatively, the distance between the trailing shield and the first side shield in the medium facing surface and the distance between the trailing shield and the second side shield in the medium facing surface may each be greater or smaller than the distance between the main pole and the trailing shield in the medium facing surface.

In the magnetic head according to the present invention, the first and second guard films may be formed of a nonmagnetic insulating material or a nonmagnetic metal material.

A magnetic head manufactured by a manufacturing method for a magnetic head according to the present invention includes: a medium facing surface configured to face a recording medium; a main pole configured to generate a write magnetic field for writing data on the recording medium; a trailing shield formed of a magnetic material and located forward relative to the main pole in a direction of travel of the recording medium; a spin torque oscillator located between the main pole and the trailing shield and electrically connected to the main pole and the trailing shield; first and second side shields formed of a magnetic material and opposed to each other in a track width direction with the main pole between the first and second side shields; and first and second gap films formed of a nonmagnetic material and opposed to each other in the track width direction with the spin torque oscillator between the first and second gap films.

The manufacturing method for a magnetic head according to the present invention includes: a step of forming a main pole and first and second side shields; a step of forming first and second guard films of a nonmagnetic material on the first and second side shields; a step of forming a layered film to later become a spin torque oscillator on the main pole and the first and second guard films; a first etching step of etching a part of the layered film until the first and second guard films are exposed; a step of forming first and second gap films after the first etching step; a second etching step of etching another part of the layered film so that the layered film becomes the spin torque oscillator after the step of forming the first and second gap films; and a step of forming a trailing shield on the spin torque oscillator, the first and second side shields, and the first and second gap films.

In the manufacturing method for a magnetic head according to the present invention, the magnetic head may further include first and second guard films.

The manufacturing method for a magnetic head according to the present invention may further include a step of etching a top surface of each of the first and second side shields between the step of forming the main pole and the first and second side shields and the step of forming the first and second guard films.

The manufacturing method for a magnetic head according to the present invention may further include a step of etching a top surface of the main pole between the step of forming the first and second guard films and the step of forming the layered film.

The manufacturing method for a magnetic head according to the present invention may further include a step of removing the first and second guard films between the step of forming the first and second gap films and the second etching step.

In the present invention, the first and second guard films are formed between the trailing shield and the first and second side shields. According to the present invention, the distances between the trailing shield and the first and second side shields near the spin torque oscillator can thereby be controlled.

Other objects, features and advantages of the present invention will become fully apparent from the following description.

DETAILED DESCRIPTION OF THE PREFERRED EMBODIMENTS

First Embodiment

Figure 5:
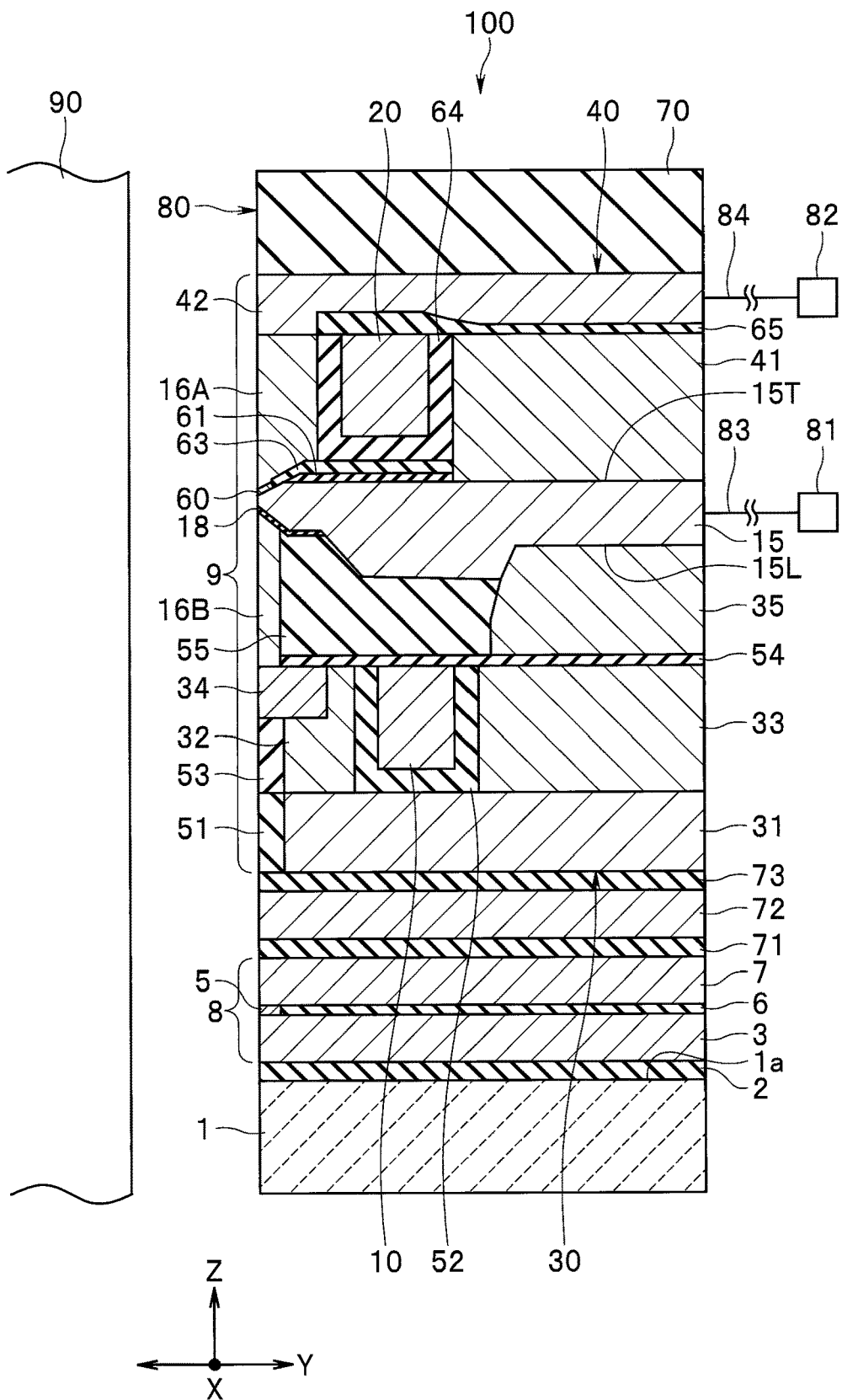
FIG. 5 is a cross-sectional view showing a configuration of the magnetic head according to the first embodiment of the invention.
Figure 6:
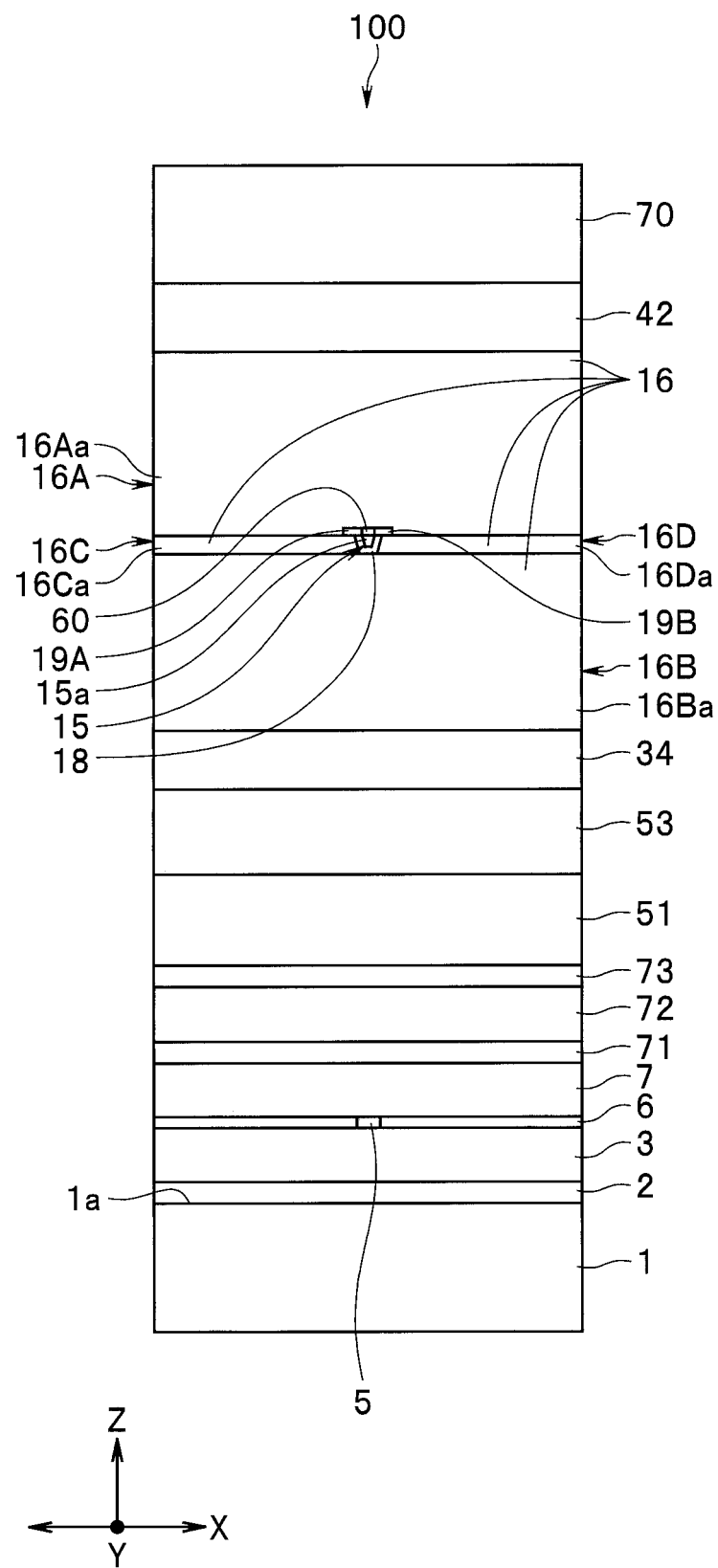
FIG. 6 is a front view showing a medium facing surface of the magnetic head according to the first embodiment of the invention.
Figure 7:
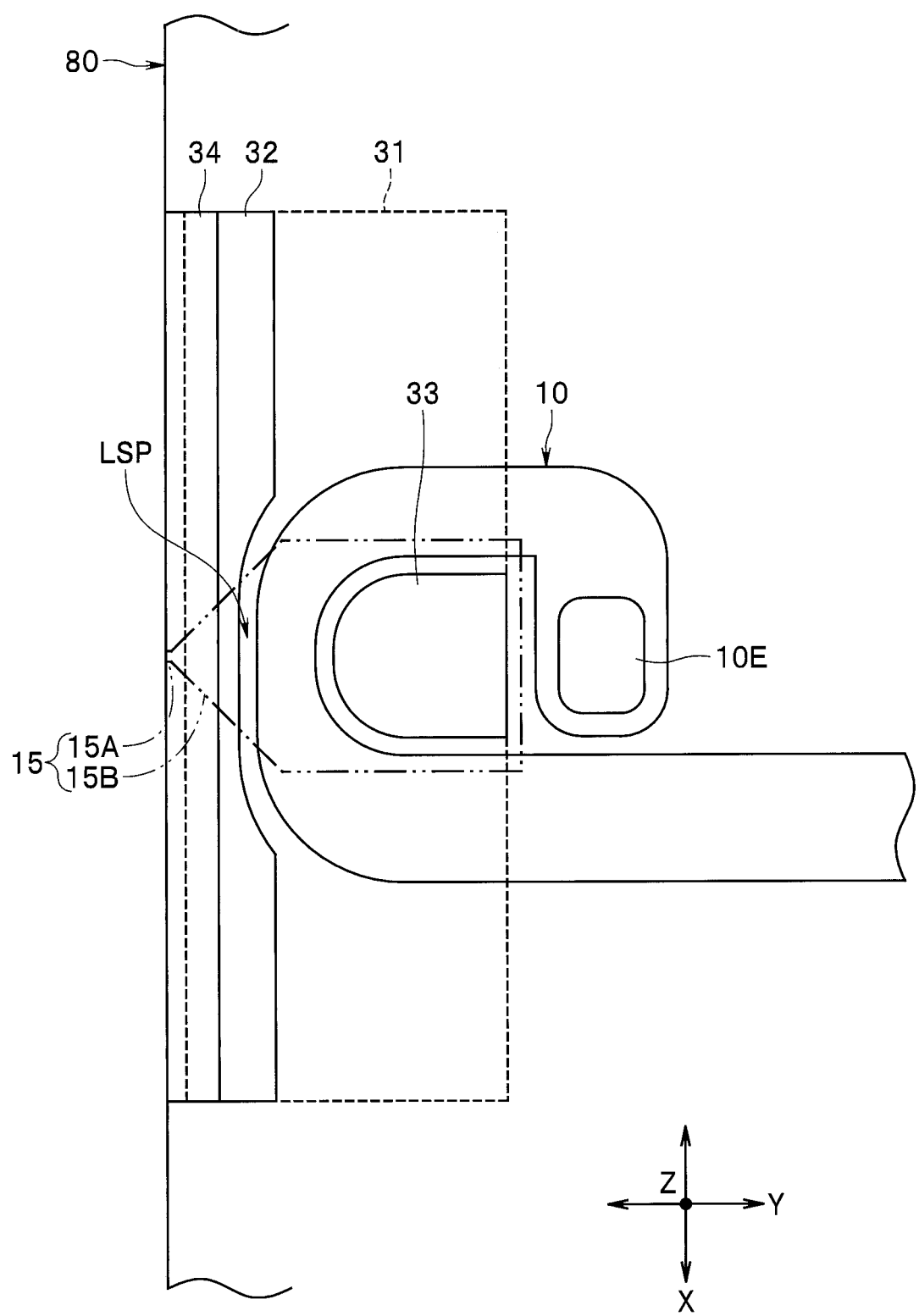
FIG. 7 is a plan view showing a lower coil portion of the magnetic head according to the first embodiment of the invention.
Figure 8:
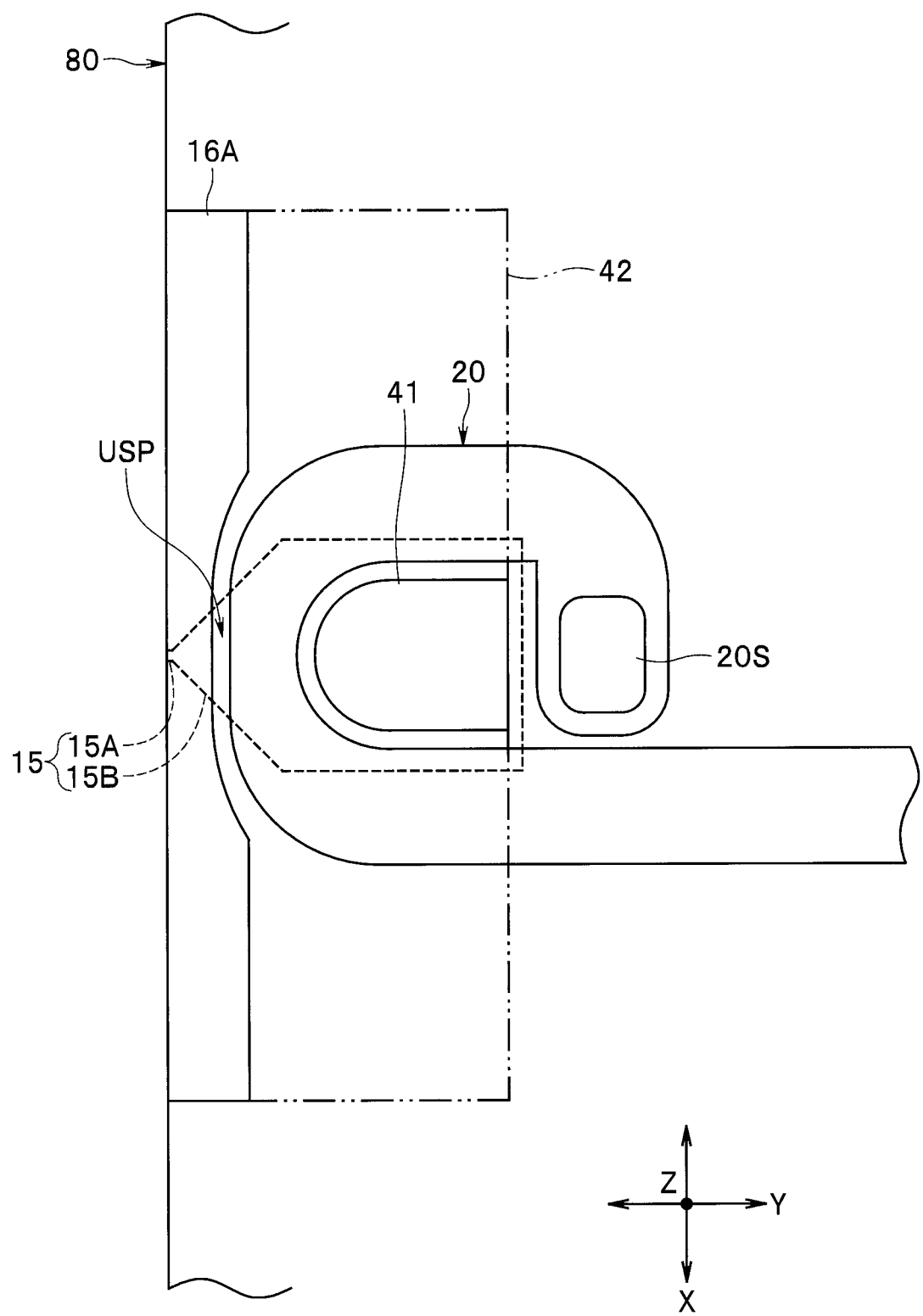
FIG. 8 is a plan view showing an upper coil portion of the magnetic head according to the first embodiment of the invention.

Preferred embodiments of the present invention will now be described in detail with reference to the drawings. First, reference is made to FIG. 5 to FIG. 8 to describe a configuration of a magnetic head according to the first embodiment of the invention. FIG. 5 is a cross-sectional view showing a configuration of the magnetic head. FIG. 6 is a front view showing a medium facing surface of the magnetic head. FIG. 7 is a plan view showing a lower coil portion of the magnetic head. FIG. 8 is a plan view showing an upper coil portion of the magnetic head.

The magnetic head 100 according to the present embodiment is one intended for perpendicular magnetic recording. The magnetic head 100 according to the present embodiment is for use with, e.g., a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

X, Y, and Z directions are defined here as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 5, the magnetic head 100 has the aforementioned medium facing surface 80. Further, as shown in FIG. 5 and FIG. 6, the magnetic head 100 includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a magnetoresistive (MR) element 5 as a read element disposed on the first read shield layer 3; an insulating layer 6 formed of an insulating material and disposed around the MR element 5; and a second read shield layer 7 formed of a magnetic material and disposed on the MR element 5 and the insulating layer 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head 100 further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has a function of shielding the MR element 5 from magnetic fields generated in the write head unit 9. The nonmagnetic layers 71 and 73 are formed of alumina, for example.

The write head unit 9 includes a coil, a main pole 15, and a write shield 16. The coil generates a magnetic field corresponding to data to be written on the recording medium 90. The coil includes an upper coil portion 20 and a lower coil portion 10. Each of the upper coil portion 20 and the lower coil portion 10 is formed of a conductive material such as copper. The upper coil portion 20 and the lower coil portion 10 are connected in series or in parallel. The main pole 15 has an end face 15a located in the medium facing surface 80, and is configured to pass a magnetic flux corresponding to the magnetic field generated by the coil and to generate a write magnetic field for writing data on the recording medium 90 by means of a perpendicular magnetic recording system. FIG. 5 shows a cross section that intersects the end face 15a of the main pole 15 and that is perpendicular to the medium facing surface 80 and to the top surface 1a of the substrate 1.

As shown in FIG. 6, the write shield 16 includes a trailing shield 16A, a leading shield 16B, a first side shield 16C, and a second side shield 16D. The trailing shield 16A is located forward relative to the main pole 15 in the direction of travel of the recording medium 90 (the Z direction). Being located forward relative to the main pole 15 in the direction of travel of the recording medium 90 refers to being located farther from the top surface 1a of the substrate 1 than the main pole 15. The leading shield 16B is located backward relative to the main pole 15 in the direction of travel of the recording medium 90. Being located backward relative to the main pole 15 in the direction of travel of the recording medium 90 refers to being located closer to the top surface 1a of the substrate 1 than the main pole 15. The first and second side shields 16C and 16D are located farther from the top surface 1a of the substrate 1 than the leading shield 16B, opposed to each other in the track width direction (the X direction) with the main pole 15 therebetween, and magnetically couple the trailing shield 16A and the leading shield 16B.

As shown in FIG. 6, the trailing shield 16A has a front end face 16Aa located in the medium facing surface 80. The leading shield 16B has a front end face 16Ba located in the medium facing surface 80. The first side shield 16C has a front end face 16Ca located in the medium facing surface 80. The second side shield 16D has a front end face 16Da located in the medium facing surface 80.

The front end face 16Aa is located forward relative to the end face 15a of the main pole 15 in the direction of travel of the recording medium 90. The front end face 16Ba is located backward relative to the end face 15a of the main pole 15 in the direction of travel of the recording medium 90. The front end faces 16Ca and 16Da are opposed to each other in the track width direction with the end face 15a of the main pole 15 therebetween. In the medium facing surface 80, the front end faces 16Aa, 16Ba, 16Ca, and 16Da are arranged to surround the end face 15a of the main pole 15.

The write shield 16 is formed of a magnetic material. For example, CoFeN, CoNiFe, FeNi, or CoFe may be used as the material of the write shield 16.

The write head unit 9 further includes a spin torque oscillator 60. The spin torque oscillator 60 is located between the main pole 15 and the trailing shield 16A in the vicinity of the medium facing surface 80 and electrically connected to the main pole 15 and the trailing shield 16A. The spin torque oscillator 60 may be an element configured to generate a microwave magnetic field or an element configured to adjust a magnetic permeability between the main pole 15 and the trailing shield 16A. The configuration of the spin torque oscillator 60 will be described in detail later.

The write head unit 9 further includes an upper return path section 40 and a lower return path section 30. Both the upper return path section 40 and the lower return path section 30 are formed of a magnetic material. For example, CoFeN, CoNiFe, FeNi, or CoFe may be used as the material of the upper return path section 40 and the lower return path section 30.

The upper return path section 40 is located forward relative to the main pole 15 in the direction of travel of the recording medium 90, and connects part of the main pole 15 located away from the medium facing surface 80 to the write shield 16, thereby magnetically coupling the main pole 15 to the write shield 16. The upper return path section 40 and the main pole 15 define an upper space USP (see FIG. 8) for a portion of the coil to pass through.

The lower return path section 30 is located backward relative to the main pole 15 in the direction of travel of the recording medium 90, and connects part of the main pole 15 located away from the medium facing surface 80 to the write shield 16, thereby magnetically coupling the main pole 15 to the write shield 16. The lower return path section 30 and the main pole 15 define a lower space LSP (see FIG. 7) for a portion of the coil to pass through.

The lower return path section 30 includes coupling portions 31, 32, 33, 34, and 35. The coupling portion 31 is disposed on the nonmagnetic layer 73. The coupling portions 32 and 33 are both disposed on the coupling portion 31. The coupling portion 32 is located near the medium facing surface 80. The coupling portion 33 is located farther from the medium facing surface 80 than the coupling portion 32. The coupling portions 31 and 32 have their respective end faces that face toward the medium facing surface 80 and that are each located at a distance from the medium facing surface 80.

As shown in FIG. 7, the lower coil portion 10 is wound around the coupling portion 33. The write head unit 9 further includes: an insulating layer 51 formed of an insulating material, disposed on the nonmagnetic layer 73 and surrounding the coupling portion 31; an insulating film 52 formed of an insulating material and isolating the lower coil portion 10 from the coupling portions 31 to 33; and an insulating layer 53 formed of an insulating material and disposed around the lower coil portion 10 and the coupling portion 32. The coupling portion 34 is embedded in the coupling portion 32 and the insulating layer 53. The coupling portion 34 has an end face located in the medium facing surface 80. The top surfaces of the lower coil portion 10, the coupling portions 32 to 34, the insulating film 52 and the insulating layer 53 are even with each other. The insulating layers 51 and 53 and the insulating film 52 are formed of alumina, for example.

The leading shield 16B lies on a part of the top surface of the coupling portion 34. The write head unit 9 further includes an insulating layer 54 formed of an insulating material. The insulating layer 54 lies on another part of the top surface of the coupling portion 34 and on the top surfaces of the lower coil portion 10, the coupling portions 32 and 33, the insulating film 52 and the insulating layer 53. The coupling portion 35 lies over the coupling portion 33 with the insulating layer 53 interposed therebetween. Note that the coupling portions 33 and 35 magnetically couple to each other even with the insulating layer 53 interposed between the coupling portions 33 and 35. The insulating layer 54 is formed of alumina, for example.

The write head unit 9 further includes a nonmagnetic layer 55 formed of a nonmagnetic material. The nonmagnetic layer 55 lies on the insulating layer 54 and surrounds the leading shield 16B and the coupling portion 35. The nonmagnetic layer 55 is formed of alumina or silicon oxide (SiO$_2$), for example.

The first and second side shields 16C and 16D are disposed on the leading shield 16B. The main pole 15 has the end face 15a, and also a top surface 15T (see FIG. 5) farthest from the top surface 1a of the substrate 1, a bottom end 15L (see FIG. 5) opposite to the top surface 15T, and a first side surface and a second side surface (see FIG. 6 to FIG. 8) opposite to each other in the track width direction (the X direction). As shown in FIG. 6, the first side shield 16C has a first sidewall opposed to a portion of the first side surface of the main pole 15 located near the medium facing surface 80. The second side shield 16D has a second sidewall opposed to a portion of the second side surface of the main pole 15 located near the medium facing surface 80.

The write head unit 9 further includes a first gap layer 18 formed of a nonmagnetic material. The first gap layer 18 is disposed to extend along the first and second sidewalls of the first and second side shields 16C and 16D, the top surface of the leading shield 16B, and the top surface of the nonmagnetic layer 55. An example of the nonmagnetic material used to form the first gap layer 18 is an insulating material such as alumina.

As shown in FIG. 5, the first gap layer 18 is interposed between a portion of the bottom end 15L of the main pole 15 and the top surfaces of the leading shield 16B and the nonmagnetic layer 55. As shown in FIG. 6, the first gap layer 18 is interposed also between the first side surface of the main pole 15 and the first sidewall of the first side shield 16C, and between the second side surface of the main pole 15 and the second sidewall of the second side shield 16D.

At a location apart from the medium facing surface 80, the bottom end 15L of the main pole 15 is in contact with the top surface of the coupling portion 35. The main pole 15 is formed of a ferromagnetic material containing one or more elements selected from Ni, Fe, and Co, such as FeNi, CoNiFe, or CoFe. The shape of the main pole 15 will be described in detail later.

The write head unit 9 further includes a first nonmagnetic layer (not shown) formed of a nonmagnetic material and disposed around the main pole 15 and the first and second side shields 16C and 16D. An example of the nonmagnetic material used to form the first nonmagnetic layer is an insulating material such as alumina.

The write head unit 9 further includes a buffer layer 59 formed of a nonmagnetic conductive material. Note that the buffer layer 59 is shown in FIG. 1 to FIG. 4 to be described later. The buffer layer 59 is located near the medium facing surface 80, lies on the top surface 15T of the main pole 15 and is in contact with the top surface 15T of the main pole 15. The spin torque oscillator 60 lies on the buffer layer 59. The buffer layer 59 is formed of, for example, one of Ta, Al, Ti, Mn, Ni, Zn, Zr, Nb, Mo, Ru, Rh, Pd, Ag, Hf, W, Ir, Pt, and Au, or an alloy composed of two or more of these elements.

The write head unit 9 further includes: a nonmagnetic layer 61 formed of a nonmagnetic material and disposed on a first portion of the top surface 15T of the main pole 15, the first portion being located away from the buffer layer 59 and the spin torque oscillator 60; and an insulating layer 63 formed of an insulating material and disposed to cover the main pole 15 and the nonmagnetic layer 61. The nonmagnetic layer 61 is formed of silicon oxide, for example. The insulating layer 63 is formed of alumina, for example.

The write head unit 9 further includes first and second gap films 19A and 19B formed of a nonmagnetic material. As shown in FIG. 6, the first and second gap films 19A and 19B are opposed to each other in the track width direction (X direction) with the buffer layer 59 and the spin torque oscillator 60 therebetween. An example of the nonmagnetic material constituting the first and second gap films 19A and 19B is an insulating material such as alumina.

Figure 2:
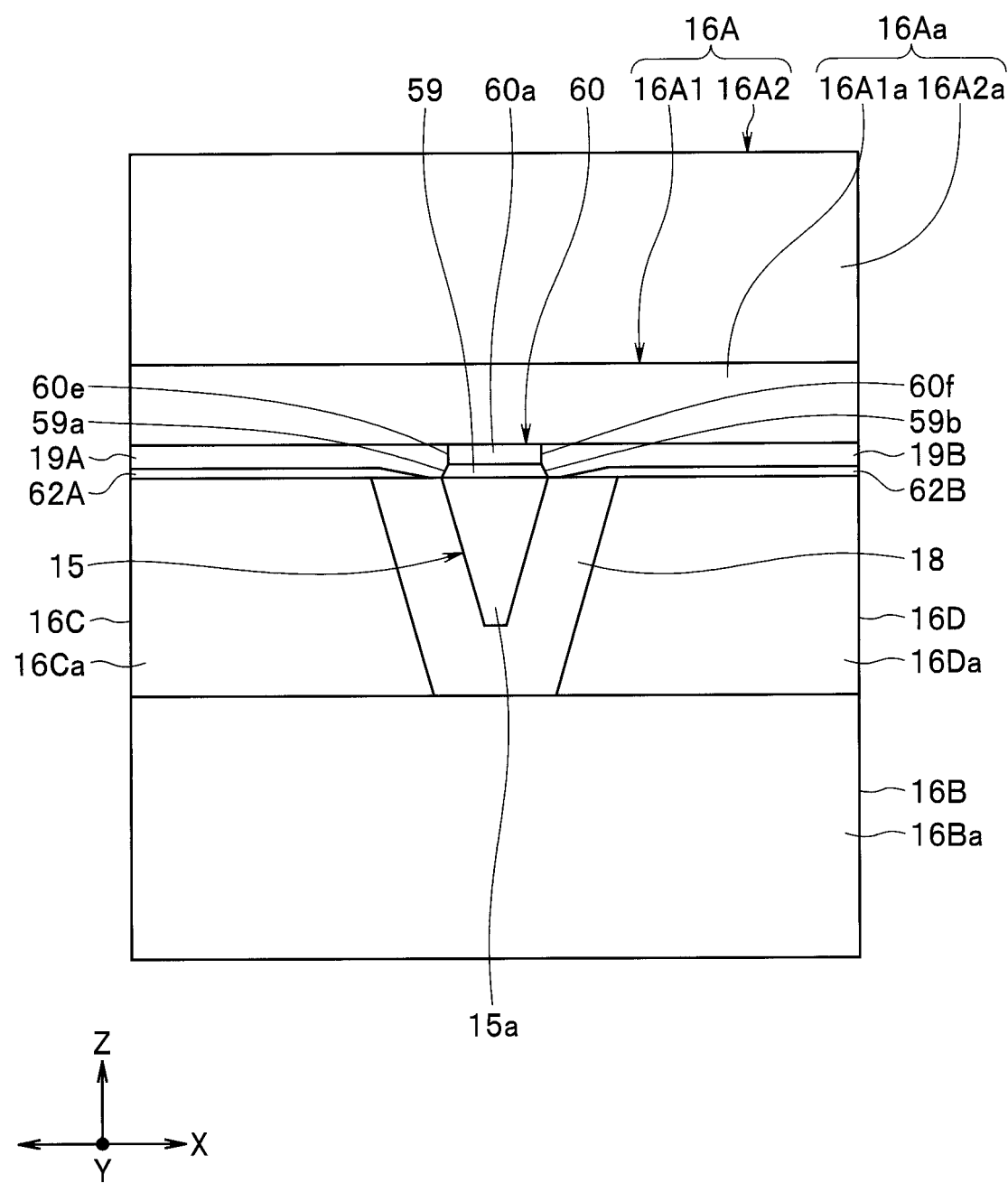
FIG. 2 is a front view showing the essential parts of the magnetic head according to the first embodiment of the invention.

The write head unit 9 further includes first and second guard films 62A and 62B formed of a nonmagnetic material. The first and second guard films 62A and 62B are shown in FIG. 2 to be described below. The first guard film 62A lies on the first side shield 16C and the first gap layer 18. The second guard film 62B lies on the second side shield 16D and the first gap layer 18. The first gap film 19A lies on the first guard film 62A. The second gap film 19B lies on the second guard film 62B. Examples of the nonmagnetic material constituting the first and second guard films 62A and 62B include a nonmagnetic insulating material such as alumina, and a nonmagnetic metal material such as Ru.

The trailing shield 16A is disposed on the first and second side shields 16C and 16D, the first and second gap films 19A and 19B, the spin torque oscillator 60 and the insulating layer 63, and in contact with the top surfaces of the first and second side shields 16C and 16D, the first and second gap films 19A and 19B, the spin torque oscillator 60 and the insulating layer 63. In the medium facing surface 80, a portion of the front end face 16Aa of the trailing shield 16A is spaced a predetermined distance away from the end face 15a of the main pole 15. The predetermined distance is preferably in the range of 5 to 60 nm, and may be 30 to 60 nm, for example.

The upper return path section 40 includes coupling portions 41 and 42. The coupling portion 41 lies on a second portion of the top surface 15T of the main pole 15, the second portion being located away from the medium facing surface 80. The second portion of the top surface 15T of the main pole 15 is located farther from the medium facing surface 80 than the first portion of the top surface 15T of the main pole 15.

As shown in FIG. 8, the upper coil portion 20 is wound around the coupling portion 41. The write head unit 9 further includes: an insulating film 64 formed of an insulating material and isolating at least part of the upper coil portion 20 from the trailing shield 16A, the coupling portion 41, and the insulating layer 63; and a second nonmagnetic layer (not shown) formed of a nonmagnetic material and disposed around the trailing shield 16A and the upper coil portion 20. The insulating film 64 is formed of alumina, for example. An example of the nonmagnetic material used to form the second nonmagnetic layer is an insulating material such as alumina.

The write head unit 9 further includes an insulating layer 65 formed of an insulating material and disposed on the upper coil portion 20, the coupling portion 41 and the insulating film 64. The insulating layer 65 includes a first portion lying on the upper coil portion 20 and a second portion lying on the coupling portion 41. The second portion is smaller in maximum thickness (maximum dimension in the Z direction) than the first portion. The insulating layer 65 is formed of alumina, for example.

The coupling portion 42 is disposed on the trailing shield 16A and the insulating layer 65. The coupling portion 42 has an end face located in the medium facing surface 80. The coupling portion 42 includes a first portion lying on the trailing shield 16A, a second portion lying over the coupling portion 41 with the insulating layer 65 interposed therebetween, and a third portion connecting the first and second portions. Note that the coupling portions 41 and 42 magnetically couple to each other even with the insulating layer 65 interposed between the coupling portion 41 and the second portion of the coupling portion 42.

The magnetic head 100 further includes a protective layer 70 formed of a nonmagnetic material and disposed to cover the write head unit 9. The protective layer 70 is formed of, e.g., an inorganic insulating material such as alumina.

As has been described, the magnetic head 100 according to the present embodiment includes the medium facing surface 80, the read head unit 8, and the write head unit 9. The read head unit 8 and the write head unit 9 are stacked on the substrate 1. The write head unit 9 is located forward relative to the read head unit 8 in the direction of travel of the recording medium 90 (the Z direction).

The write head unit 9 includes the coil including the upper coil portion 20 and the lower coil portion 10, the main pole 15, the write shield 16, the first gap layer 18, the first and second gap films 19A and 19B, the buffer layer 59, the spin torque oscillator 60, and the first and second guard films 62A and 62B. The coil, the main pole 15, the write shield 16, the first gap layer 18, the second gap layer 19, the buffer layer 59, the spin torque oscillator 60, and the first and second guard films 62A and 62B are disposed above the top surface 1a of the substrate 1. The write shield 16 includes the trailing shield 16A, the leading shield 16B, and the first and second side shields 16C and 16D.

The write head unit 9 further includes the upper return path section 40 and the lower return path section 30. The upper return path section 40 includes the coupling portions 41 and 42. The lower return path section 30 includes the coupling portions 31, 32, 33, 34, and 35.

The write shield 16 captures a disturbance magnetic field applied to the magnetic head 100 from outside the magnetic head 100. This makes it possible to prevent erroneous writing on the recording medium 90 that would be caused by the disturbance magnetic field being intensively captured into the main pole 15. The write shield 16 further has a function of capturing a magnetic flux that is generated from the end face 15a of the main pole 15 and spreads in directions other than the direction perpendicular to the plane of the recording medium 90, and thereby preventing the magnetic flux from reaching the recording medium 90. Furthermore, the write shield 16, the upper return path section 40 and the lower return path section 30 have a function of causing a magnetic flux that has been generated from the end face 15a of the main pole 15 and has magnetized a portion of the recording medium 90 to flow back.

The spin torque oscillator 60 is electrically connected to the main pole 15 and the trailing shield 16A. In the present embodiment, specifically, the spin torque oscillator 60 is electrically connected to the main pole 15 via the buffer layer 59. As shown in FIG. 5, the magnetic head 100 further includes: two terminals 81 and 82 connected to a power source (not shown); wiring 83 for electrically connecting the terminal 81 and the main pole 15; and wiring 84 for electrically connecting the terminal 82 and the coupling portion 42. The trailing shield 16A is electrically connected to the coupling portion 42. A current for operating the spin torque oscillator 60, which will hereinafter be referred to as a driving current, is supplied via the terminals 81 and 82. The driving current flows through the main pole 15, the buffer layer 59, the spin torque oscillator 60, the trailing shield 16A, and the coupling portion 42 in this order.

Figure 4:
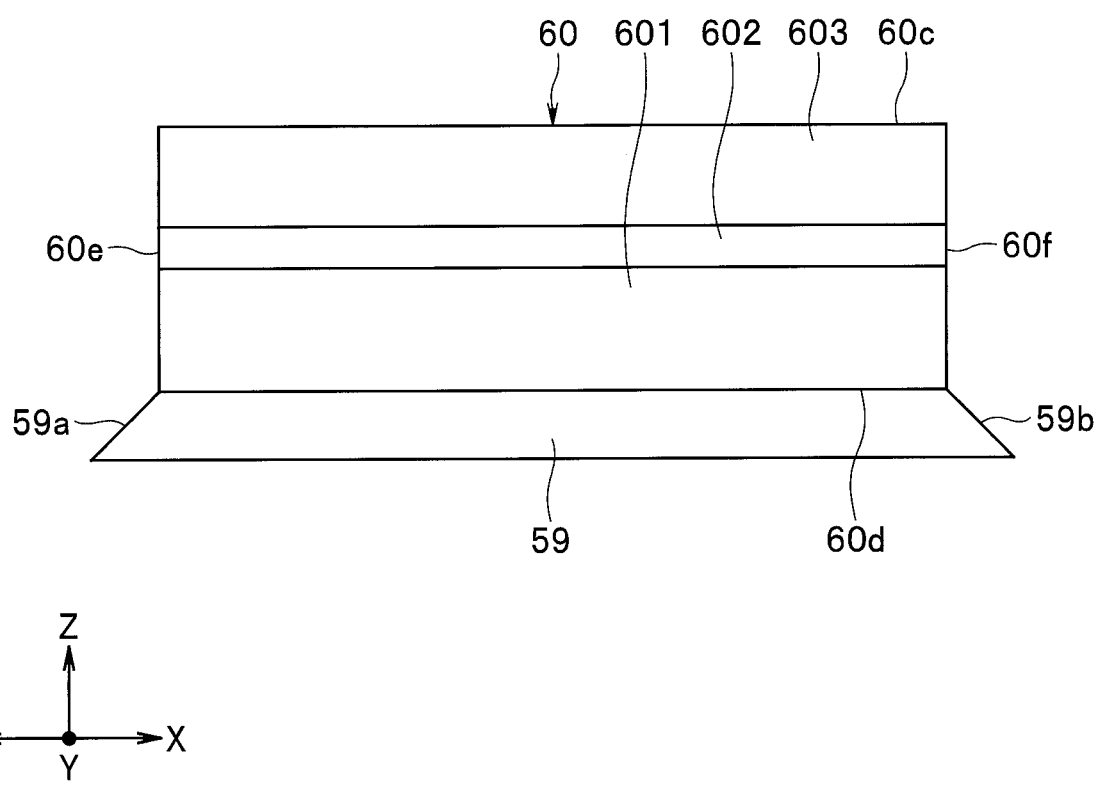
FIG. 4 is a front view showing a spin torque oscillator in the magnetic head according to the first embodiment of the invention.

Reference is now made to FIG. 4 to describe a configuration of the spin torque oscillator 60. FIG. 4 is a front view showing the spin torque oscillator 60. The spin torque oscillator 60 shown in FIG. 4 is one configured to generate a microwave magnetic field. This spin torque oscillator 60 includes a magnetic-field generating layer 601, a nonmagnetic layer 602, and a spin injection layer 603 stacked in this order, from closest to farthest from the buffer layer 59.

The magnetic-field generating layer 601 is formed of a material whose magnetization direction is parallel or almost parallel to the film plane when no driving current flows. The magnetic-field generating layer 601 may be a magnetic layer formed of one of FeCo, FeCoAl, FeCoSi, FeCoB, and FeNi, a layered film composed of alternately stacked layers of FeCo and Ni, or a layered film composed of alternately stacked layers of Fe and Co.

The nonmagnetic layer 602 is formed of a material having high spin permeability. The nonmagnetic layer 602 may be a nonmagnetic metal layer formed of one of Ag, Au, Cr, and Al, or a tunnel barrier layer formed of MgO or $Al_2O_3$.

The spin injection layer 603 is formed of a material having magnetic anisotropy in a direction perpendicular to the film plane. The spin injection layer 603 may be a layered film composed of alternately stacked layers of CoFe and Ni, a layered film composed of alternately stacked layers of Co and Pt, a layered film composed of alternately stacked layers of Co and Pd, or an alloy layer formed of one of CoPt, FePt, and MnGa.

The spin torque oscillator 60 may further include a protective layer disposed on the spin injection layer 603. The protective layer is formed of a nonmagnetic metal material. For example, the protective layer is formed of one of Ta, Al, Ti, Mn, Fe, Co, Ni, Cu, Zn, Zr, Nb, Mo, Ru, Rh, Pd, Ag, Hf, W, Ir, Pt, and Au, or an alloy composed of two or more of these elements.

In the spin torque oscillator 60 shown in FIG. 4, passing a driving current in the direction from the magnetic-field generating layer 601 to the spin injection layer 603 imparts a spin torque to the magnetization of the magnetic-field generating layer 601 to cause precession of the magnetization of the magnetic-field generating layer 601. As a result, a microwave magnetic field is generated from the magnetic-field generating layer 601.

Reference is now made to FIG. 7 and FIG. 8 to describe the connection relationship between the upper coil portion 20 and the lower coil portion 10 of the coil. As shown in FIG. 7, the lower coil portion 10 has a coil connection 10E electrically connected to the upper coil portion 20. As shown in FIG. 8, the upper coil portion 20 has a coil connection 20S electrically connected to the coil connection 10E of the lower coil portion 10. The coil connection 20S is electrically connected to the coil connection 10E via a first and a second connection layer of columnar shape (not shown) that penetrate a plurality of layers interposed between the upper coil portion 20 and the lower coil portion 10. The first and second connection layers are stacked in this order on the coil connection 10E. The coil connection 20S lies on the second connection layer. The first and second connection layers are formed of a conductive material such as copper. In the example shown in FIG. 7 and FIG. 8, the upper coil portion 20 and the lower coil portion 10 are connected in series.

Figure 1:
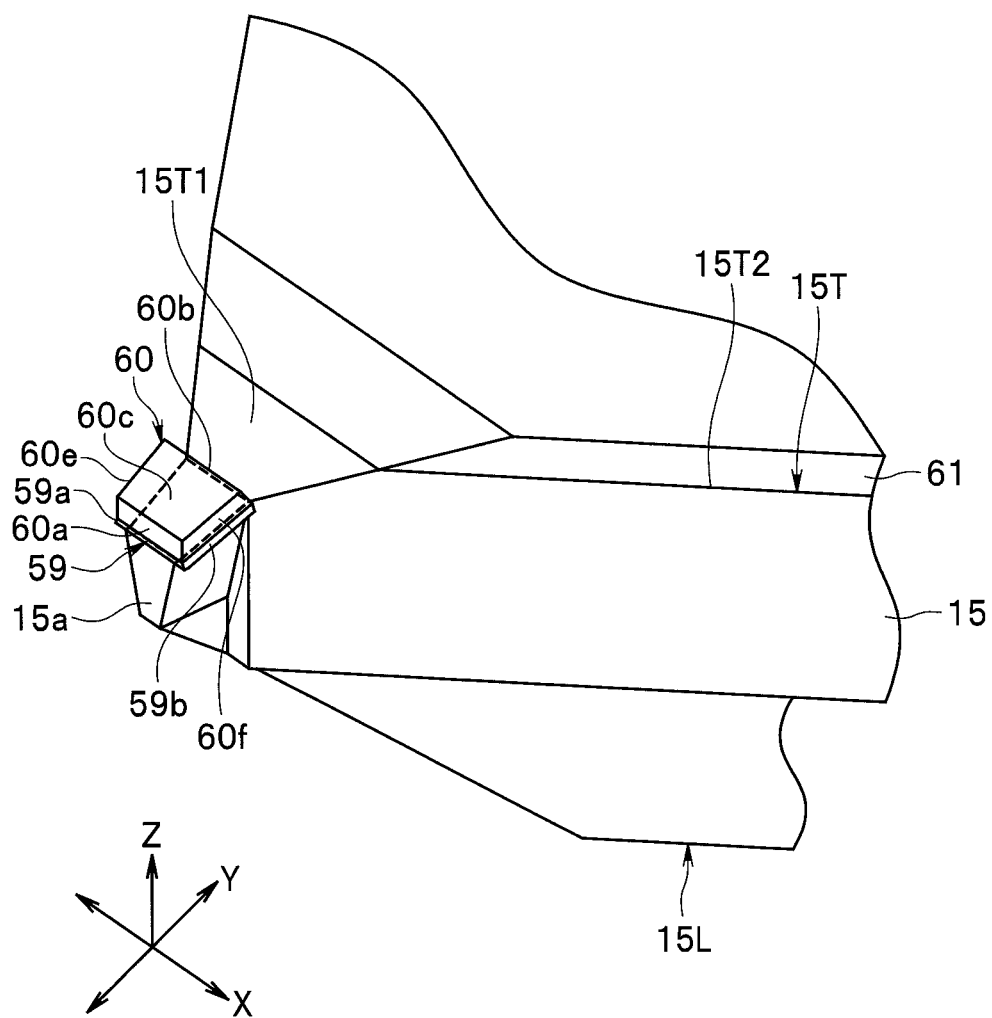
FIG. 1 is a perspective view showing essential parts of a magnetic head according to a first embodiment of the invention.
Figure 3:
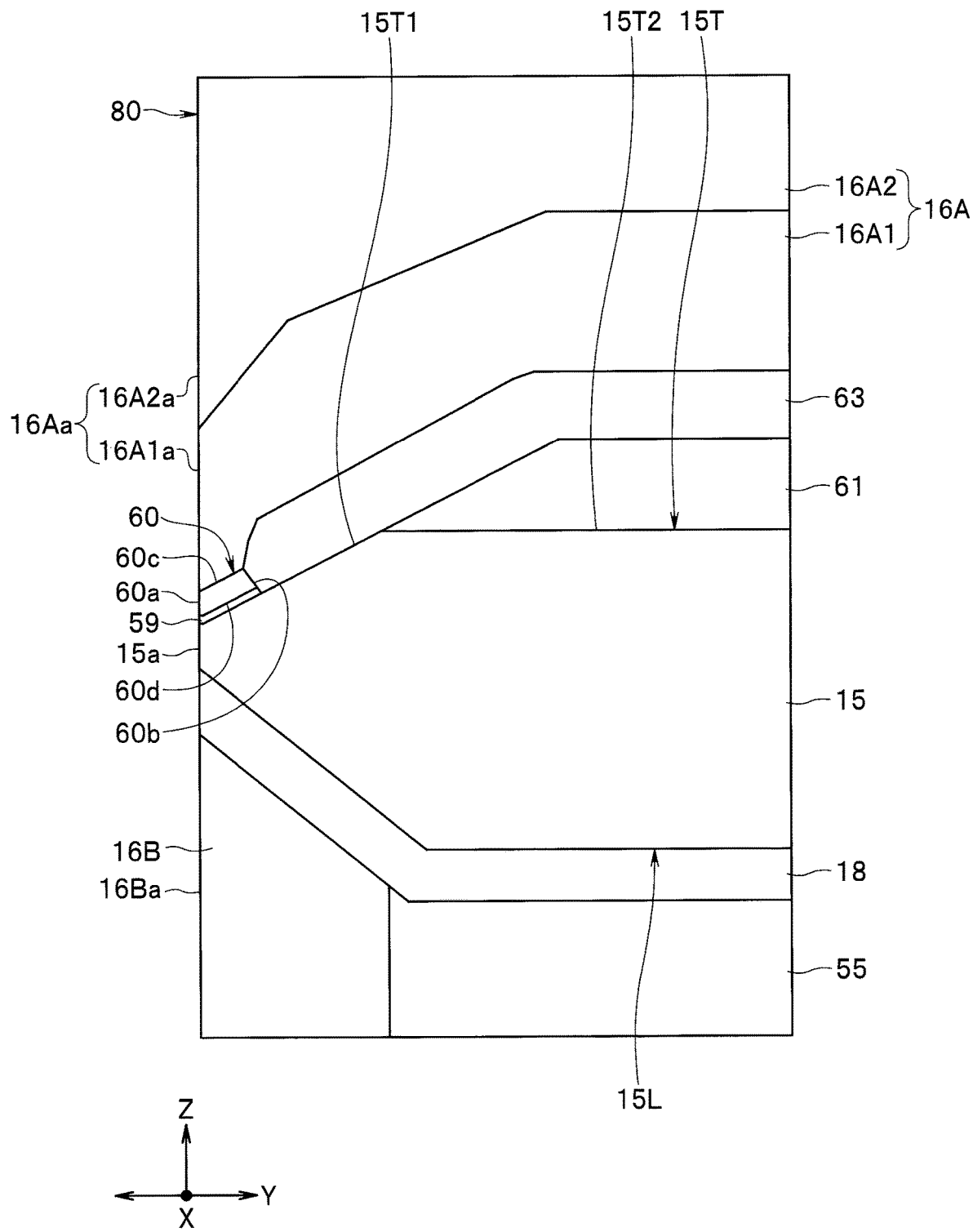
FIG. 3 is a cross-sectional view showing the essential parts of the magnetic head according to the first embodiment of the invention.

Now, the shape of the main pole 15 will be described in detail with reference to FIG. 1 to FIG. 3, FIG. 5, FIG. 7, and FIG. 8. FIG. 1 is a perspective view showing essential parts of the magnetic head 100. FIG. 2 is a front view showing essential parts of the magnetic head 100. FIG. 3 is a cross-sectional view showing essential parts of the magnetic head 100.

As shown in FIG. 7 and FIG. 8, the main pole 15 includes a track width defining portion 15A having the end face 15a and an end opposite thereto, and a wide portion 15B connected to the end of the track width defining portion 15A. The main pole 15 has the top surface 15T, the bottom end 15L, the first side surface, and the second side surface. Hereinafter, a width in the track width direction (the X direction) will be simply referred to as a width. The width of the top surface 15T is greater in the wide portion 15B than in the track width defining portion 15A. The width of the top surface 15T in the track width defining portion 15A gradually increases with increasing distance from the medium facing surface 80, and then becomes constant.

As shown in FIG. 1 and FIG. 3, the top surface 15T includes an inclined portion 15T1 and a flat portion 15T2, the inclined portion 15T1 being closer to the medium facing surface 80 than the flat portion 15T2. The inclined portion 15T1 has a first end closest to the medium facing surface 80 and a second end opposite thereto. The flat portion 15T2 is connected to the second end of the inclined portion 15T1. The inclined portion 15T1 is inclined such that the second end is located forward relative to the first end in the direction of travel of the recording medium 90 (the Z direction). The flat portion 15T2 extends substantially in a direction perpendicular to the medium facing surface 80 (the Y direction).

As shown in FIG. 3, the bottom end 15L includes a first inclined portion and a first flat portion, the first inclined portion being closer to the medium facing surface 80 than the first flat portion. The first inclined portion has a third end located in the medium facing surface 80, and a fourth end opposite thereto. The first inclined portion may be an edge formed by two intersecting surfaces, or may be a surface connecting two surfaces to each other. The first flat portion is a surface connected to the fourth end of the first inclined portion. The first inclined portion is inclined such that the fourth end is located backward relative to the third end in the direction of travel of the recording medium 90 (the Z direction). The first flat portion extends substantially in a direction perpendicular to the medium facing surface 80 (the Y direction).

As shown in FIG. 5, the bottom end 15L further includes a second inclined portion and a second flat portion. The second inclined portion is a surface connected to an end of the first flat portion opposite from the first inclined portion. The second flat portion is a surface connected to an end of the second inclined portion opposite from the first flat portion. The second inclined portion is inclined in a manner similar to that in which the first inclined portion is inclined. The second flat portion extends substantially in a direction perpendicular to the medium facing surface 80 (the Y direction), like the first flat portion.

As shown in FIG. 2, the end face 15a of the main pole 15 has a top edge farthest from the top surface 1a of the substrate 1, a first side edge connected to one end of the top edge, and a second side edge connected to the other end of the top edge. In the present embodiment, specifically, the top edge is in contact with the buffer layer 59. The top edge defines the track width. The position of an end of a recording bit to be recorded on the recording medium 90 is determined by the position of the top edge. The width in the track width direction of the end face 15a of the main pole 15 decreases with increasing distance from the top edge, i.e., with decreasing distance to the top surface 1a of the substrate 1.

Each of the first side edge and the second side edge forms an angle in the range of, for example, 7° to 17°, preferably 10° to 15°, with respect to a direction perpendicular to the top surface 1a of the substrate 1. The top edge has a length in the range of 0.05 to 0.20 μm, for example.

Next, the shapes of the buffer layer 59 and the spin torque oscillator 60 will be described in detail with reference to FIG. 1 to FIG. 4. As shown in FIG. 1 to FIG. 4, the spin torque oscillator 60 has a front end face 60a facing the medium facing surface 80, a rear end face 60b farthest from the medium facing surface 80, a top surface 60c farthest from the top surface 1a of the substrate 1, a bottom surface 60d closest to the top surface 1a of the substrate 1, and a first side surface 60e and a second side surface 60f opposite to each other in the track width direction (the X direction). In the present embodiment, specifically, the front end face 60a is located in the medium facing surface 80.

The top surface 60c is in contact with the trailing shield 16A. The bottom surface 60d is in contact with the buffer layer 59. The first and second side surfaces 60e and 60f are perpendicular or substantially perpendicular to the top surface 1a (see FIG. 5 and FIG. 6) of the substrate 1. The first side surface 60e and the second side surface 60f respectively form a first angle and a second angle with respect to a direction perpendicular to the top surface 1a of the substrate 1. The first and second angles each are preferably in the range of 0° to 15°, more preferably in the range of 0° to 10°.

As shown in FIG. 1 to FIG. 4, the buffer layer 59 has an end face located in the medium facing surface 80, a top surface farthest from the top surface 1a of the substrate 1, a bottom surface closest to the top surface 1a of the substrate 1, and a third side surface 59a and a fourth side surface 59b opposite to each other in the track width direction (the X direction). The top surface of the buffer layer 59 is in contact with the bottom surface 60d of the spin torque oscillator 60. The bottom surface of the buffer layer 59 is in contact with the inclined portion 15T1 of the top surface 15T of the main pole 15.

As shown in FIG. 2 and FIG. 4, the third side surface 59a of the buffer layer 59 is contiguous with the first side surface 60e of the spin torque oscillator 60. The third side surface 59a forms a third angle greater than the aforementioned first angle with respect to the direction perpendicular to the top surface 1a of the substrate 1. The third angle falls within the range of, e.g., 10° to 70°. If the first angle is 10°, the third angle is greater than 10°.

As shown in FIG. 2 and FIG. 4, the fourth side surface 59b of the buffer layer 59 is contiguous with the second side surface 60f of the spin torque oscillator 60. The fourth side surface 59b forms a fourth angle greater than the aforementioned second angle with respect to the direction perpendicular to the top surface 1a of the substrate 1. The fourth angle falls within the range of, e.g., 10° to 70°. If the second angle is 10°, the fourth angle is greater than 10°.

Next, the shapes and layout of the trailing shield 16A, the first and second gap films 19A and 19B, and the first and second guard films 62A and 62B will be described in detail with reference to FIG. 2 and FIG. 6. As shown in FIG. 2, the trailing shield 16A includes a seed layer 16A1 and a magnetic layer 16A2 located on the seed layer 16A1. The seed layer 16A1 has an end face 16A1a located in the medium facing surface 80. The magnetic layer 16A2 has an end face 16A2a located in the medium facing surface 80. The front end face 16Aa of the trailing shield 16A includes the end faces 16A1a and 16A2a.

As shown in FIG. 2, the first gap film 19A and the first guard film 62A are interposed between the trailing shield 16A and the first side shield 16C near the spin torque oscillator 60. Particularly, in the present embodiment, the first guard film 62A is interposed between the first gap film 19A and the first side shield 16C. As shown in FIG. 6, at a position away from the spin torque oscillator 60, the first gap film 19A and the first guard film 62A are not interposed between the trailing shield 16A and the first side shield 16C, and the bottom surface of the trailing shield 16A (bottom surface of the seed layer 16A1) and the top surface of the first side shield 16C are in contact with each other.

As shown in FIG. 2, the second gap film 19B and the second guard film 62B are interposed between the trailing shield 16A and the second side shield 16D near the spin torque oscillator 60. Particularly, in the present embodiment, the second guard film 62B is interposed between the second gap film 19B and the second side shield 16D. As shown in FIG. 6, at a position away from the spin torque oscillator 60, the second gap film 19B and the second guard film 62B are not interposed between the trailing shield 16A and the second side shield 16D, and the bottom surface of the trailing shield 16A (bottom surface of the seed layer 16A1) and the top surface of the second side shield 16D are in contact with each other.

Near the spin torque oscillator 60, the distance between the trailing shield 16A and the first side shield 16C in the medium facing surface 80 and the distance between the trailing shield 16A and the second side shield 16D in the medium facing surface 80 are each the same or substantially the same as the distance between the main pole 15 and the trailing shield 16A in the medium facing surface 80. In terms of positions in a direction parallel to the direction of travel of the recording medium 90 (Z direction), the top surface 15T of the main pole 15, the top surface of the first side shield 16C, and the top surface of the second side shield 16D are each located at the same or substantially the same positions in the medium facing surface 80. Additionally, the top surface 60c of the spin torque oscillator 60, the top surface of the first gap film 19A, and the top surface of the second gap film 19B are located at the same or substantially the same positions in the medium facing surface 80.

As shown in FIG. 2, the first and second gap films 19A and 19B are in contact with the spin torque oscillator 60. By contrast, the first and second guard films 62A and 62B are not in contact with the spin torque oscillator 60.

Next, a manufacturing method for the magnetic head 100 according to the present embodiment will be described. The manufacturing method for the magnetic head 100 according to the present embodiment starts with forming the insulating layer 2, the first read shield layer 3, and the MR element 5 in this order on the substrate 1, as shown in FIG. 5 and FIG. 6. Next, the insulating layer 6 is formed around the MR element 5. The second read shield layer 7, the nonmagnetic layer 71, the middle shield layer 72, and the nonmagnetic layer 73 are then formed in this order over the MR element 5 and the insulating layer 6.

Next, the coupling portion 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the coupling portion 31 is exposed. Next, the coupling portions 32 and 33 are formed on the coupling portion 31 by frame plating, for example. The insulating film 52 is then formed over the entire top surface of the stack. Next, the lower coil portion 10 is formed by frame plating, for example. The insulating layer 53 is then formed over the entire top surface of the stack.

The insulating film 52 and the insulating layer 53 are then polished by, for example, CMP, until the lower coil portion 10 and the coupling portions 32 and 33 are exposed.

Next, the coupling portion 32 and the insulating layer 53 are etched to form therein an accommodation part to accommodate the coupling portion 34. Then, the coupling portion 34 is formed to be accommodated in the accommodation part. The insulating layer 54 is then formed over the entire top surface of the stack. Next, the insulating layer 54 is selectively etched to form therein a first opening for exposing the top surface of the coupling portion 34 and a second opening for exposing the coil connection 10E (see FIG. 7) of the lower coil portion 10. Then, the leading shield 16B is formed on the coupling portion 34 at the position of the first opening, the coupling portion 35 is formed on a portion of the insulating layer 54 covering the top surface of the coupling portion 33, and the first connection layer (not shown) is formed on the coil connection 10E at the position of the second opening, by performing frame plating, for example.

Next, the nonmagnetic layer 55 is formed over the entire top surface of the stack. The nonmagnetic layer 55 is then polished by, for example, CMP, until the leading shield 16B, the coupling portion 35 and the first connection layer are exposed. Then, the leading shield 16B and the nonmagnetic layer 55 are taper-etched in part by, for example, ion beam etching (hereinafter referred to as IBE) so as to provide the top surface of the leading shield 16B with a portion to be opposed to the first inclined portion (see FIG. 2) of the bottom end 15L of the main pole 15 to be formed later, and provide the top surface of the nonmagnetic layer 55 with a portion to be opposed to the second inclined portion (see FIG. 5) of the bottom end 15L of the main pole 15 to be formed later. The coupling portion 35 and the first connection layer are also etched in part by this etching.

Next, the first and second side shields 16C and 16D are formed on the leading shield 16B by, for example, frame plating. The first gap layer 18 is then formed to cover the leading shield 16B and the first and second side shields 16C and 16D. In the case of using alumina as the material of the first gap layer 18, the first gap layer 18 is formed by atomic layer deposition (hereinafter referred to as ALD), for example. The first gap layer 18 is then selectively etched to form therein an opening for exposing the top surface of the coupling portion 35, and an opening for exposing the top surface of the first connection layer. Next, an initial main pole, which becomes the main pole 15 later, and the second connection layer (not shown) are formed by frame plating, for example. The initial main pole and the second connection layer are formed such that their top surfaces are higher in level than portions of the first gap layer 18 that are located on the first and second side shields 16C and 16D.

Next, the first nonmagnetic layer (not shown) is formed over the entire top surface of the stack. The initial main pole, the second connection layer, the first gap layer 18, and the first nonmagnetic layer are then polished by, for example, CMP until the first and second side shields 16C and 16D are exposed. Next, the nonmagnetic layer 61 is formed on the initial main pole. The initial main pole and the nonmagnetic layer 61 are then taper-etched by, e.g, IBE so as to provide the initial main pole with the inclined portion 15T1 (see FIG. 1 and FIG. 3) of the top surface 15T of the main pole 15. This makes the initial main pole into the main pole 15. The first and second side shields 16C and 16D, the first gap layer 18, and the first nonmagnetic layer are also etched in part by this etching.

Reference is now made to FIG. 9 to FIG. 17 to describe a series of steps to be performed after the foregoing step up to the formation of the trailing shield 16A. FIG. 9 to FIG. 17 each show a stack of layers formed in the process of manufacturing the magnetic head 100. FIG. 9 to FIG. 17 omit the illustration of portions that are closer to the substrate 1 relative to the leading shield 16B. FIG. 9 to FIG. 17 each show a cross section of the stack taken at the position where the medium facing surface 80 is to be formed.

Figure 9:
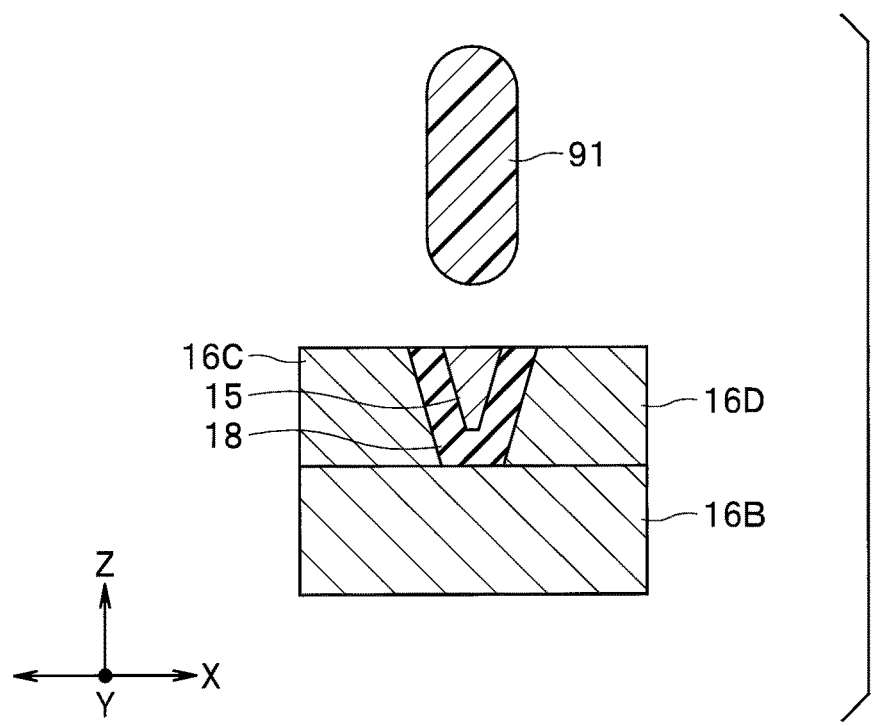
FIG. 9 is a cross-sectional view showing a step of a manufacturing method for the magnetic head according to the first embodiment of the invention.

FIG. 9 shows a step following the formation of the main pole 15. In this step, a mask 91 is initially formed on the stack including the main pole 15. The mask 91 has two openings for exposing the top surfaces of the respective first and second side shields 16C and 16D. The mask 91 includes a lower layer lying on the stack and an upper layer lying on the lower layer. The upper layer is formed of a photoresist patterned by photolithography. The lower layer is formed of, for example, a material that dissolves in a developing solution used in patterning the upper layer. When the upper layer is patterned, a portion of the lower layer located in and near a cross section taken at the position where the medium facing surface 80 is to be formed is removed. As a result, as shown in FIG. 9, a gap develops between the stack and the mask 91 in the cross section taken at the position where the medium facing surface 80 is to be formed. Note that even if the foregoing portion of the lower layer is removed, the mask 91 will not peel away since the lower layer remains between the stack and the upper layer except in and near the cross section taken at the position where the medium facing surface 80 is to be formed.

Figure 10:
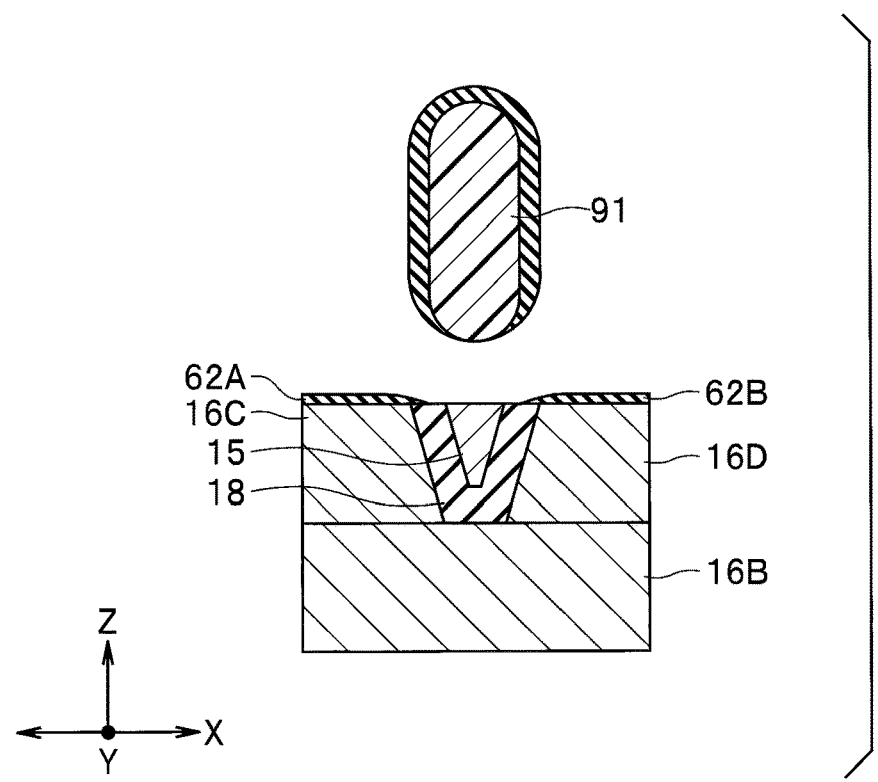
FIG. 10 is a cross-sectional view showing a step that follows the step shown in FIG. 9.

FIG. 10 shows the next step. In this step, a nonmagnetic film of a nonmagnetic material is initially formed over the entire top surface of the stack. The portion of the nonmagnetic film formed on the first side shield 16C makes the first guard film 62A. The portion of the nonmagnetic film formed on the second side shield 16D makes the second guard film 62B. The mask 91 is then removed.

Figure 11:
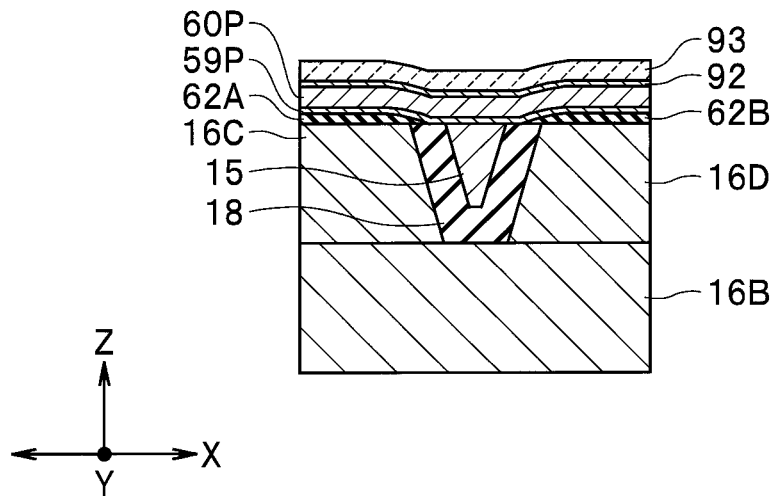
FIG. 11 is a cross-sectional view showing a step that follows the step shown in FIG. 10.

FIG. 11 shows the next step. In this step, first, an initial buffer layer 59P, which becomes the buffer layer 59 later, is formed on the stack. Next, a layered film 60P, which becomes the spin torque oscillator 60 later, is formed on the initial buffer layer 59P. As in the example shown in FIG. 4, the spin torque oscillator 60 is composed of a plurality of layers. The layered film 60P includes all the layers to constitute the spin torque oscillator 60.

In the step shown in FIG. 11, a nonmagnetic metal layer 92 of Ru is then formed on the layered film 60P. Next, a protective layer 93 is formed on the nonmagnetic metal layer 92. The protective layer 93 is what is called a hard mask, and is formed of an inorganic material. In the present embodiment, specifically, the protective layer 93 is formed of carbon. The protective layer 93 has a thickness in the range of 10 to 30 nm, for example.

Figure 12:
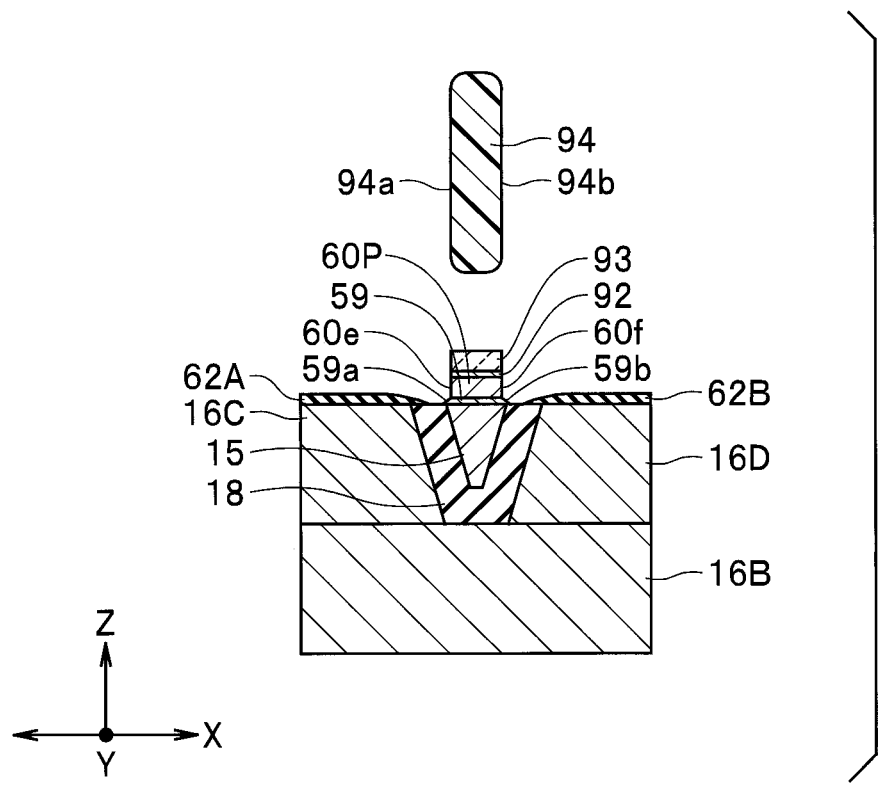
FIG. 12 is a cross-sectional view showing a step that follows the step shown in FIG. 11.

FIG. 12 shows the next step. In this step, first, a mask 94 is formed on the protective layer 93. The mask 94 has a first sidewall 94a defining the shape and the position of each of the first side surface 60e of the spin torque oscillator 60 and the third side surface 59a of the buffer layer 59, and a second sidewall 94b defining the shape and the position of each of the second side surface 60f of the spin torque oscillator 60 and the fourth side surface 59b of the buffer layer 59. Like the mask 91, the mask 94 includes a lower layer and an upper layer. The lower layer is located on the protective layer 93. As shown in FIG. 12, a gap develops between the protective layer 93 and the mask 94 in the cross section taken at the position where the medium facing surface 80 is to be formed.

In the step shown in FIG. 12, part of the protective layer 93 is then etched by using the mask 94. This etching is performed by using reactive ion etching (hereinafter, referred to as RIE), for example. In the case where the protective layer 93 is of carbon, a gas containing $O_2$ is used as an etching gas. The nonmagnetic metal layer 92 functions as an etching stopper to stop etching when the protective layer 93 is etched by RIE.

In the step shown in FIG. 12, the layered film 60P, the initial buffer layer 59P, and the nonmagnetic metal layer 92 are each etched in part by using the mask 94 and the protective layer 93 as etching masks. This etching is performed by using IBE, for example. The etching etches part of each of the layered film 60P and the initial buffer layer 59P so that the first and second side surfaces 60e and 60f of the spin torque oscillator 60 are formed on the layered film 60P, and the third and fourth side surfaces 59a and 59b of the buffer layer 59 are formed on the initial buffer layer 59P. Providing the initial buffer layer 59P with the third and fourth side surfaces 59a and 59b makes the initial buffer layer 59P into the buffer layer 59. The etching is performed until the first and second guard films 62A and 62B are exposed. The first and second guard films 62A and 62B function as an etching stopper, and protect the first and second side shields 16C and 16D.

Figure 13:
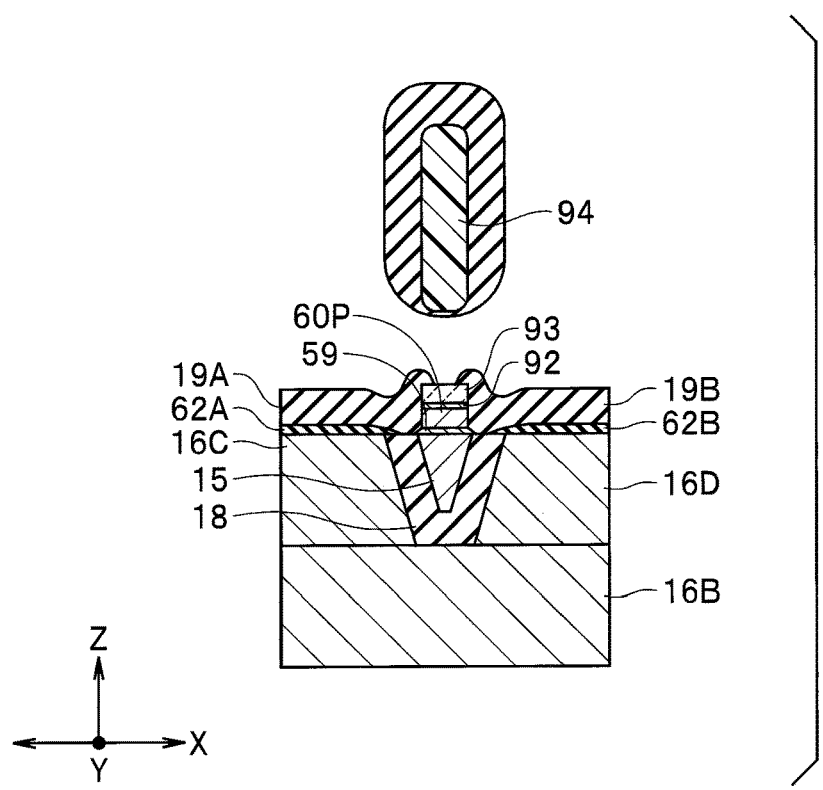
FIG. 13 is a cross-sectional view showing a step that follows the step shown in FIG. 12.

FIG. 13 shows the next step. In this step, a nonmagnetic film of a nonmagnetic material is initially formed over the entire top surface of the stack by using, e.g., ion beam deposition with the mask 94 left unremoved. Next, the nonmagnetic film is etched by, e.g., IBE to planarize the top surface of the nonmagnetic film. The portion of the nonmagnetic film formed on the first guard film 62A makes the first gap film 19A. The portion of the nonmagnetic film formed on the second guard film 62B makes the second gap film 19B.

Figure 14:
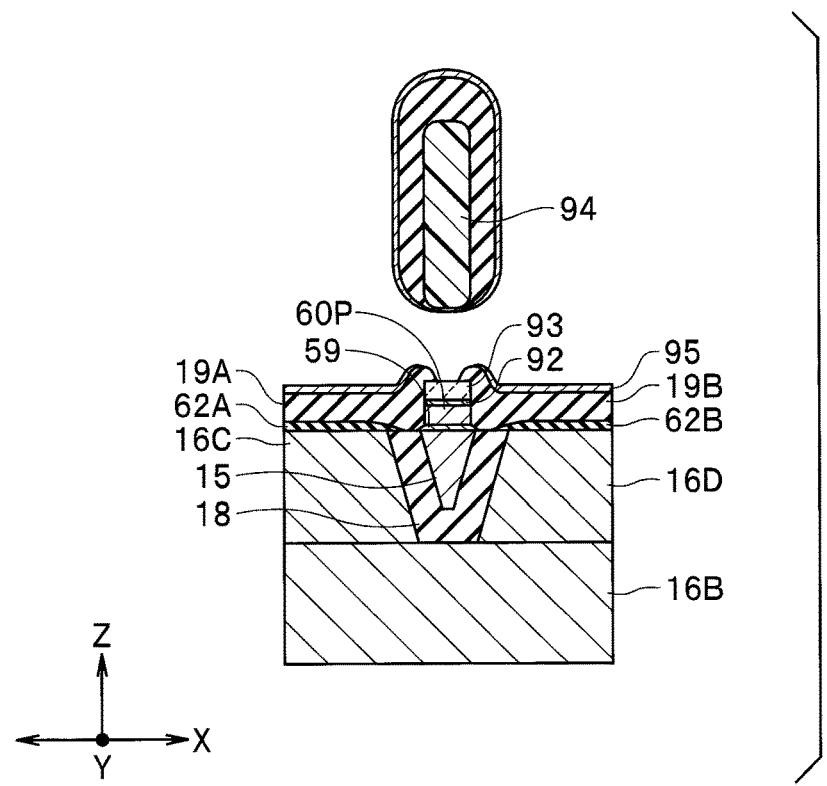
FIG. 14 is a cross-sectional view showing a step that follows the step shown in FIG. 13.

FIG. 14 shows the next step. In this step, a nonmagnetic metal layer 95 of Ru is formed over the entire top surface of the stack with the mask 94 left unremoved.

Figure 15:
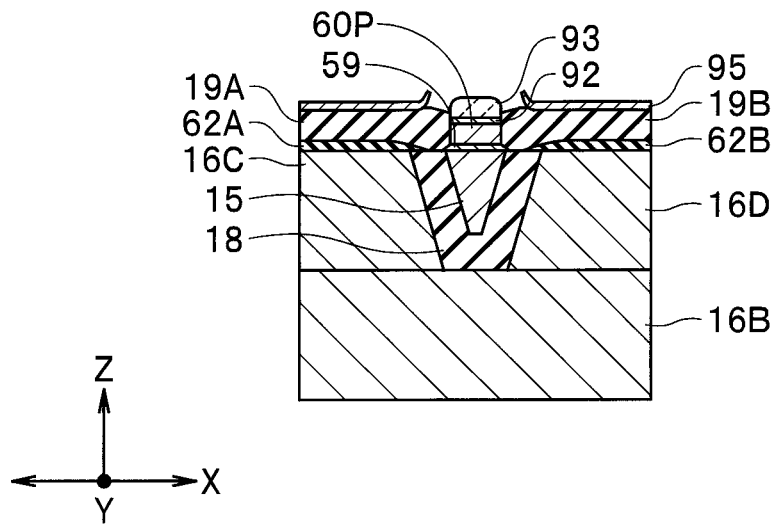
FIG. 15 is a cross-sectional view showing a step that follows the step shown in FIG. 14.

FIG. 15 shows the next step. In this step, the mask 94 is initially lifted off. Next, needless portions of the first and second gap films 19A and 19B on the protective layer 93 are removed by wet etching, for example. The nonmagnetic metal layer 95 has the function of protecting the portions of the first and second gap films 19A and 19B other than the foregoing needless portions from etching.

Figure 16:
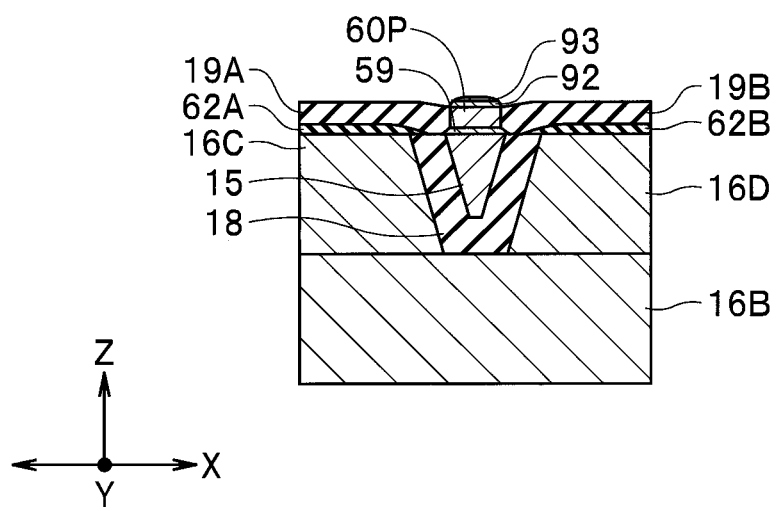
FIG. 16 is a cross-sectional view showing a step that follows the step shown in FIG. 15.

FIG. 16 shows the next step. In this step, the nonmagnetic metal layer 95 is removed and the first and second gap films 19A and 19B are etched in part by IBE, for example. The etching is performed until the first and second gap films 19A and 19B each have a desired thickness.

Figure 17:
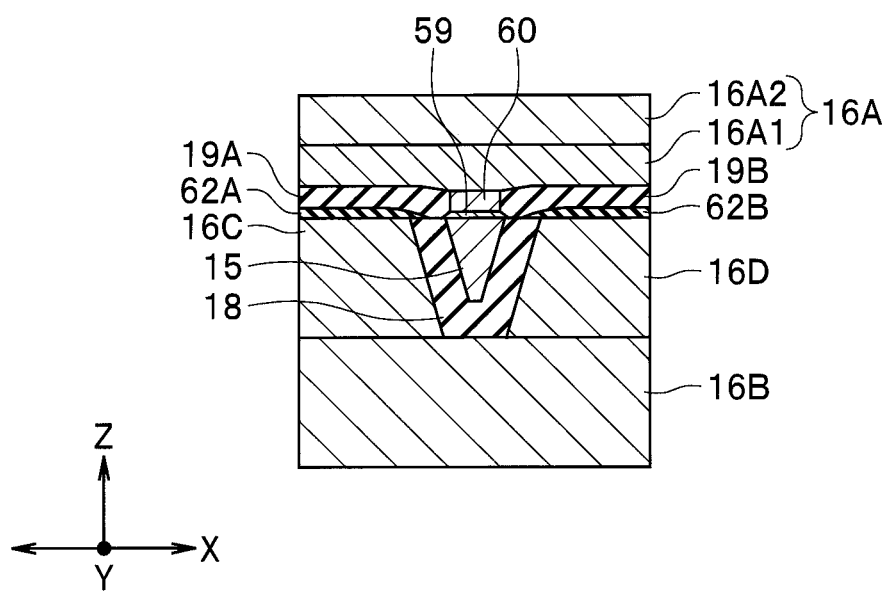
FIG. 17 is a cross-sectional view showing a step that follows the step shown in FIG. 16.
Figure 18:
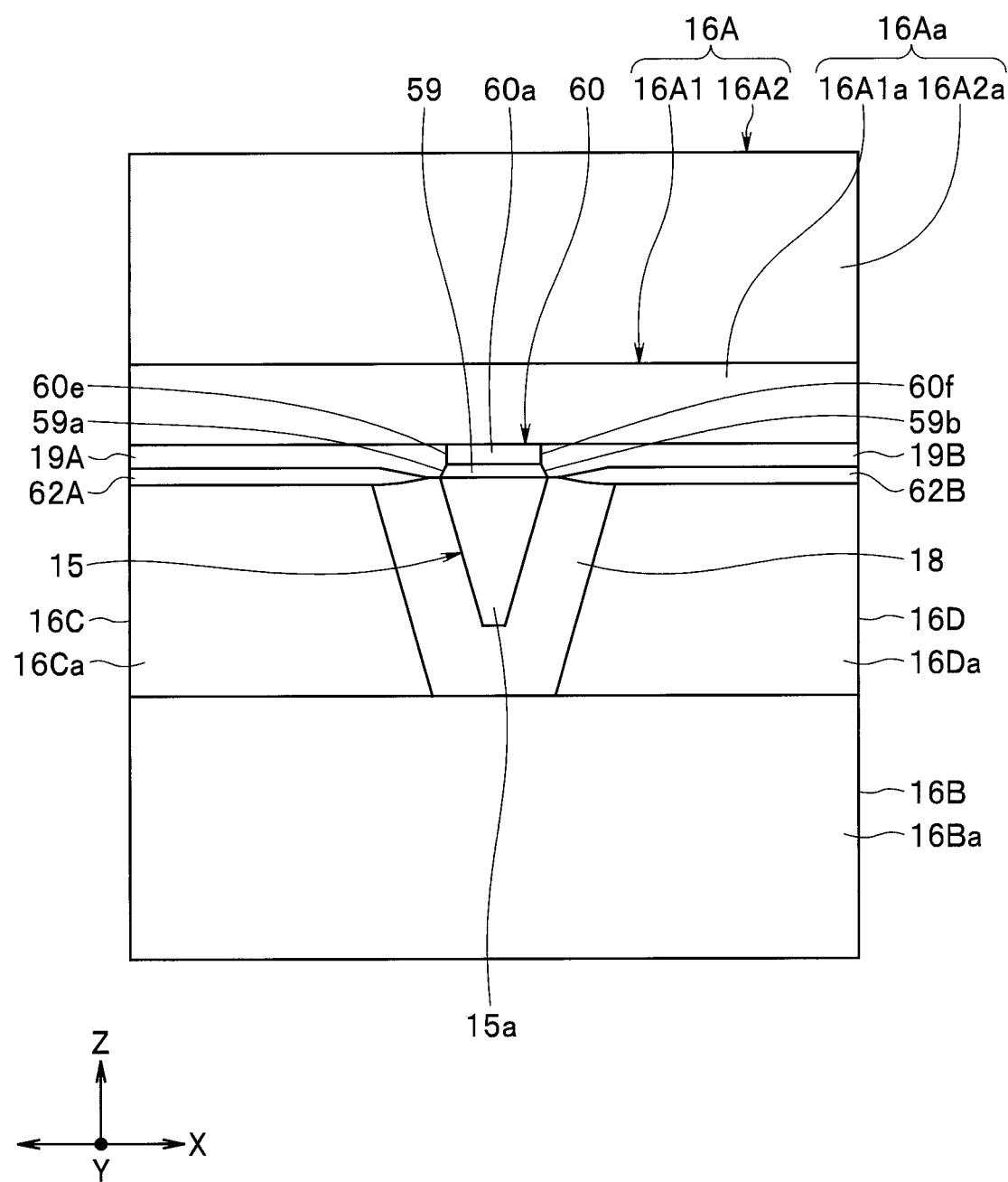
FIG. 18 is a front view showing essential parts of a magnetic head according to a second embodiment of the invention.

FIG. 17 shows the next step. In this step, first, the protective layer 93 is removed. In the case where the protective layer 93 is of carbon, the protective layer 93 is removed by ashing, for example. Next, the nonmagnetic metal layer 92 is removed by IBE, for example.

In the step shown in FIG. 17, a not-shown mask is then formed on the stack. Next, another part of the layered film 60P is etched by, e.g, IBE using the mask as an etching mask so that the rear end face 60b (see FIG. 1 and FIG. 3) of the spin torque oscillator 60 is formed on the layered film 60P. This makes the layered film 60P into the spin torque oscillator 60. In this step, the etching of the layered film 60P is followed by etching of the buffer layer 59 until the inclined portion 15T1 of the top surface 15T of the main pole 15 is exposed. The etching of the buffer layer 59 removes the portion of the buffer layer 59 not covered with the spin torque oscillator 60. Next, the insulating layer 63

(see FIG. 3 and FIG. 5) is formed over the entire top surface of the stack with the mask left unremoved. The mask is then lifted off.

In the step shown in FIG. 17, the first gap film 19A and the first guard film 62A are then selectively etched so that part of the top surface of the first side shield 16C is exposed. The second gap film 19B and the second guard film 62B are also selectively etched so that part of the top surface of the second side shield 16D is exposed. Next, the seed layer 16A1 is formed on the first and second side shields 16C and 16D, the first and second gap films 19A and 19B, and the insulating layer 63. The magnetic layer 16A2 is then formed by using the seed layer 16A1 as a seed and an electrode. The trailing shield 16A is thereby completed.

Steps following the formation of the trailing shield 16A will be described below with reference to FIG. 5 and FIG. 6. First, the nonmagnetic layer 61 and the insulating layer 63 are selectively etched by, for example, IBE so that the second portion of the top surface 15T of the main pole 15 is exposed. Then, the coupling portion 41 is formed on the main pole 15 by, for example, frame plating. Next, the insulating film 64 is formed over the entire top surface of the stack.

The insulating film 64 is then selectively etched to form therein an opening for exposing the top surface of the second connection layer. Next, the upper coil portion 20 is formed by frame plating, for example. The second nonmagnetic layer (not shown) is then formed over the entire top surface of the stack. The insulating film 64 and the second nonmagnetic layer are then polished by, for example, CMP, until the trailing shield 16A, the upper coil portion 20 and the coupling portion 41 are exposed.

Next, the insulating layer 65 is formed over the entire top surface of the stack. Then, the insulating layer 65 is selectively etched to form therein an opening for exposing the top surface of the trailing shield 16A, and the top surface of a portion of the insulating layer 65 covering the top surface of the coupling portion 41 is also etched. The coupling portion 42 is then formed by frame plating, for example. Next, the protective layer 70 is formed to cover the entire top surface of the stack. For example, the step of forming the wirings 83 and 84 is performed simultaneously with a series of steps from the step of forming the main pole 15 to the step of forming the protective layer 70.

Next, wiring and a plurality of terminals including the terminals 81 and 82 are formed on the protective layer 70, and the substrate 1 is cut near the position ABS where the medium facing surface 80 is to be formed. The cut surface is then polished into the medium facing surface 80, and further processes such as fabrication of flying rails are performed to complete the magnetic head 100.

As described above, the manufacturing method for the magnetic head 100 according to the present embodiment includes a step of forming the first and second guard films 62A and 62B on the first and second side shields 16C and 16D, a step of forming the layered film 60P to later become the spin torque oscillator 60 on the main pole 15 and the first and second guard films 62A and 62B, and a first etching step of etching part of the layered film 60P until the first and second guard films 62A and 62B are exposed.

In the present embodiment, the first gap film 19A and the first guard film 62A are interposed between the trailing shield 16A and the first side shield 16C near the spin torque oscillator 60. The distance between the trailing shield 16A and the first side shield 16C near the spin torque oscillator 60 is the same as the total thickness of the first gap film 19A and the first guard film 62A. According to the present embodiment, the distance between the trailing shield 16A and the first side shield 16C near the spin torque oscillator 60 can be controlled by controlling the thickness of each of the first gap film 19A and the first guard film 62A.

Similarly, the second gap film 19B and the second guard film 62B are interposed between the trailing shield 16A and the second side shield 16D near the spin torque oscillator 60. The distance between the trailing shield 16A and the second side shield 16D near the spin torque oscillator 60 is the same as the total thickness of the second gap film 19B and the second guard film 62B. According to the present embodiment, the distance between the trailing shield 16A and the second side shield 16D near the spin torque oscillator 60 can be controlled by controlling the thickness of each of the second gap film 19B and the second guard film 62B.

According to the present embodiment, in the first etching step, the first and second guard films 62A and 62B can prevent the top surfaces of the first and second side shields 16C and 16D from being etched. In other words, according to the present embodiment, unintended etching of the first and second side shields 16C and 16D can be prevented. Consequently, according to the present embodiment, the distance between the trailing shield 16A and the first side shield 16C near the spin torque oscillator 60 and the distance between the trailing shield 16A and the second side shield 16D near the spin torque oscillator 60 can be precisely controlled. For example, by precisely controlling the distances, the distances in the medium facing surface 80 can be made the same as that between the main pole 15 and the trailing shield 16A in the medium facing surface 80.

According to the present embodiment, the first and second side surfaces 60e and 60f of the spin torque oscillator 60 can be made perpendicular or substantially perpendicular to the top surface 1a of the substrate 1 while preventing unintended etching of the first and second side shields 16C and 16D. This effect will now be described in detail. A surface parallel or substantially parallel to the top surface 1a of the substrate 1 will be referred to as a horizontal surface. A surface perpendicular or substantially perpendicular to the top surface 1a of the substrate 1 will be referred to as a perpendicular surface. The horizontal surface and the perpendicular surface formed by etching are typically tapered therebetween. Without the first and second guard films 62A and 62B, forming each of the first and second side surfaces 60e and 60f on the layered film 60P as an entirely perpendicular surface will inevitably cause etching on the first and second side shields 16C and 16D. On the other hand, avoiding etching the first and second side shields 16C and 16D will inevitably result in the partial or entire tapering of each of the first and second side surfaces 60e and 60f formed on the layered film 60P.

By contrast, according to the present embodiment, the first and second side surfaces 60e and 60f can each be formed on the layered film 60P as an entirely perpendicular surface since the unintended etching of the first and second side shields 16C and 16D can be prevented by the first and second guard films 62A and 62B.

Note that, in the first etching step, the formation of redeposition film of etched and scattered substances can sometimes occur. Without the first and second guard films 62A and 62B, the etching time in the first etching step needs to be reduced to prevent the unintended etching of the first and second side shields 16C and 16D. In such a case, failure of fully removing the redeposition film within the reduced etching time can occur.

By contrast, according to the present embodiment, the redeposition film can be removed while the unintended etching of the first and second side shields 16C and 16D is prevented by the first and second guard films 62A and 62B. If the first etching step uses IBE, the redeposition film can be removed by tilting the direction of travel of the ion beam in a direction perpendicular to the top surface 1a of the substrate 1.

Second Embodiment

Next, a second embodiment of the invention will be described. Reference is first made to FIG. 17 to describe differences of the magnetic head 100 according to the present embodiment from that according to the first embodiment. FIG. 17 is a front view showing essential parts of the magnetic head 100 according to the present embodiment.

In the present embodiment, the distance between the trailing shield 16A and the first side shield 16C near the spin torque oscillator 60 and the distance between the trailing shield 16A and the second side shield 16D near the spin torque oscillator 60 are different from those in the first embodiment. More specifically, near the spin torque oscillator 60, the distance between the trailing shield 16A and the first side shield 16C in the medium facing surface 80 and the distance between the trailing shield 16A and the second side shield 16D in the medium facing surface 80 are each greater than the distance between the main pole 15 and the trailing shield 16A in the medium facing surface 80.

Next, a manufacturing method for the magnetic head 100 according to the present embodiment will be described with reference to FIG. 19 to FIG. 22. FIG. 19 to FIG. 22 each show a stack of layers formed in the process of manufacturing the magnetic head 100 according to the present embodiment. FIG. 19 to FIG. 22 omit the illustration of portions that are closer to the substrate 1 (see FIG. 5 and FIG. 6) relative to the leading shield 16B. FIG. 19 to FIG. 22 each show a cross section of the stack taken at the position where the medium facing surface 80 is to be formed.

Figure 19:
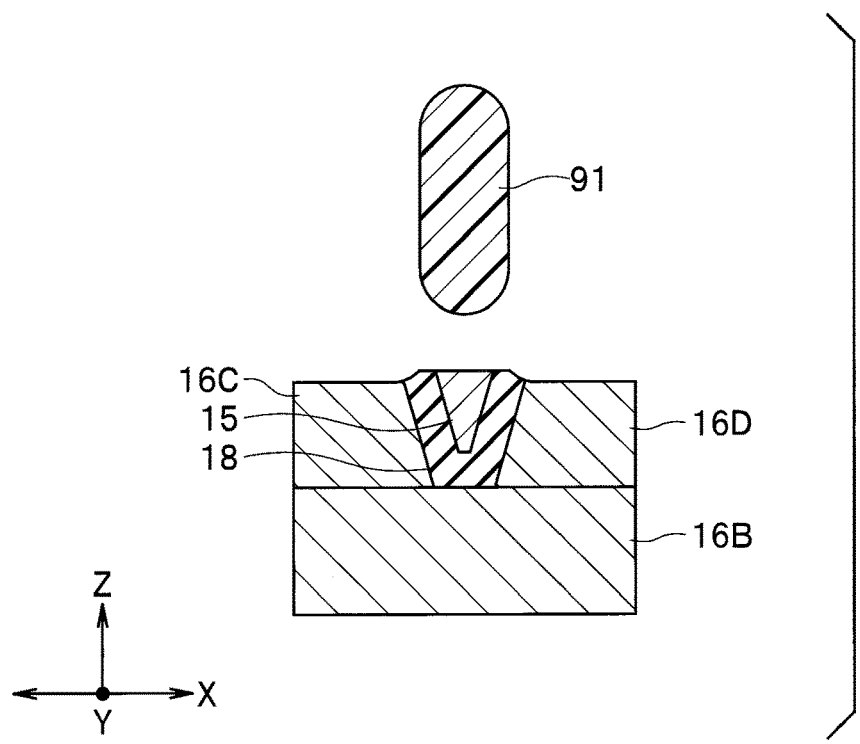
FIG. 19 is a cross-sectional view showing a step of a manufacturing method for the magnetic head according to the second embodiment of the invention.

The manufacturing method for the magnetic head 100 according to the present embodiment is the same as the method according to the first embodiment up to the step of forming the mask 91. FIG. 19 shows a step following the formation of the mask 91. In this step, the top surfaces of the first and second side shields 16C and 16D are etched by, e.g., IBE using the mask 91 as an etching mask until the top surfaces of the first and second side shields 16C and 16D reach a desired position. This etching also etches part of the first gap layer 18.

Figure 20:
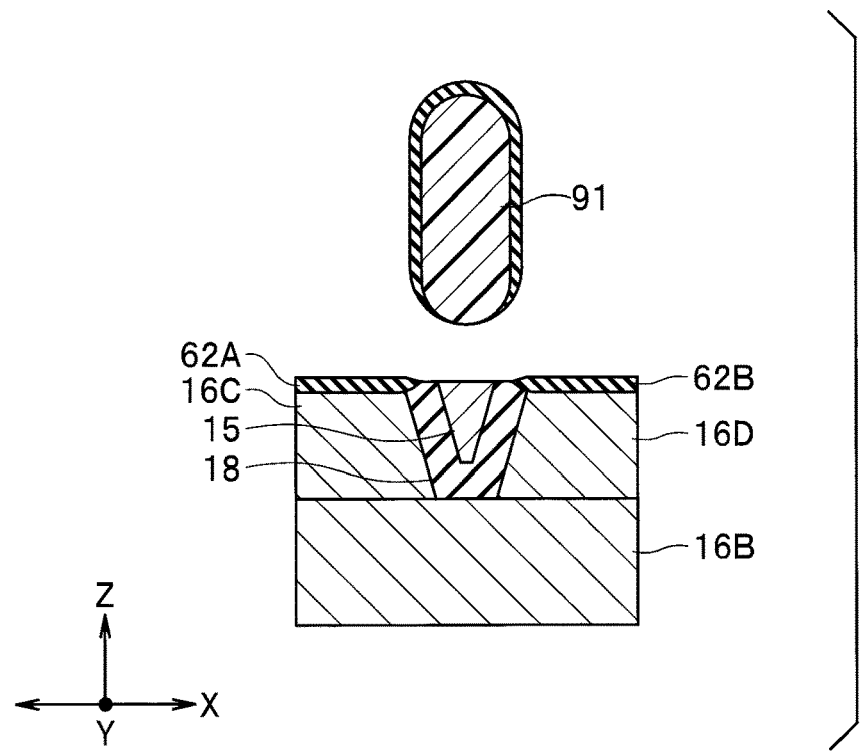
FIG. 20 is a cross-sectional view showing a step that follows the step shown in FIG. 19.

FIG. 20 shows the next step. In this step, a nonmagnetic film of a nonmagnetic material is initially formed over the entire top surface of the stack. The portion of the nonmagnetic film formed on the first side shield 16C makes the first guard film 62A. The portion of the nonmagnetic film formed on the second side shield 16D makes the second guard film 62B. The mask 91 is then removed.

Figure 21:
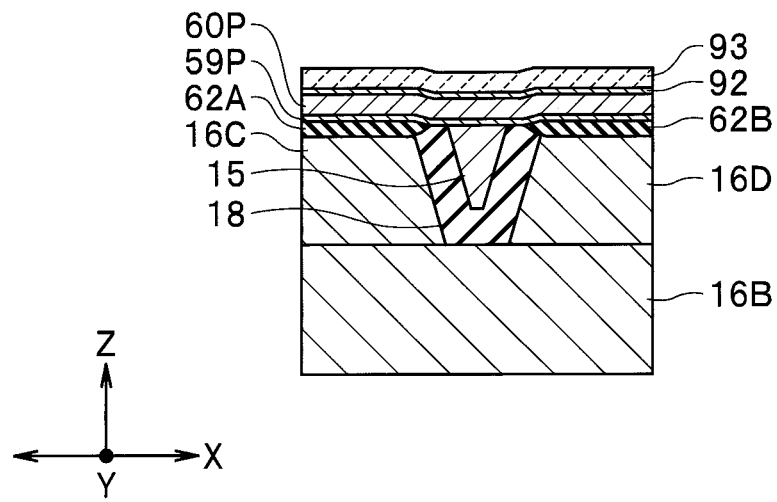
FIG. 21 is a cross-sectional view showing a step that follows the step shown in FIG. 20.

FIG. 21 shows the next step. In this step, like the step shown in FIG. 11 according to the first embodiment, the initial buffer layer 59P, the layered film 60P, the nonmagnetic metal layer 92, and the protective layer 93 are formed in this order on the stack.

Figure 22:
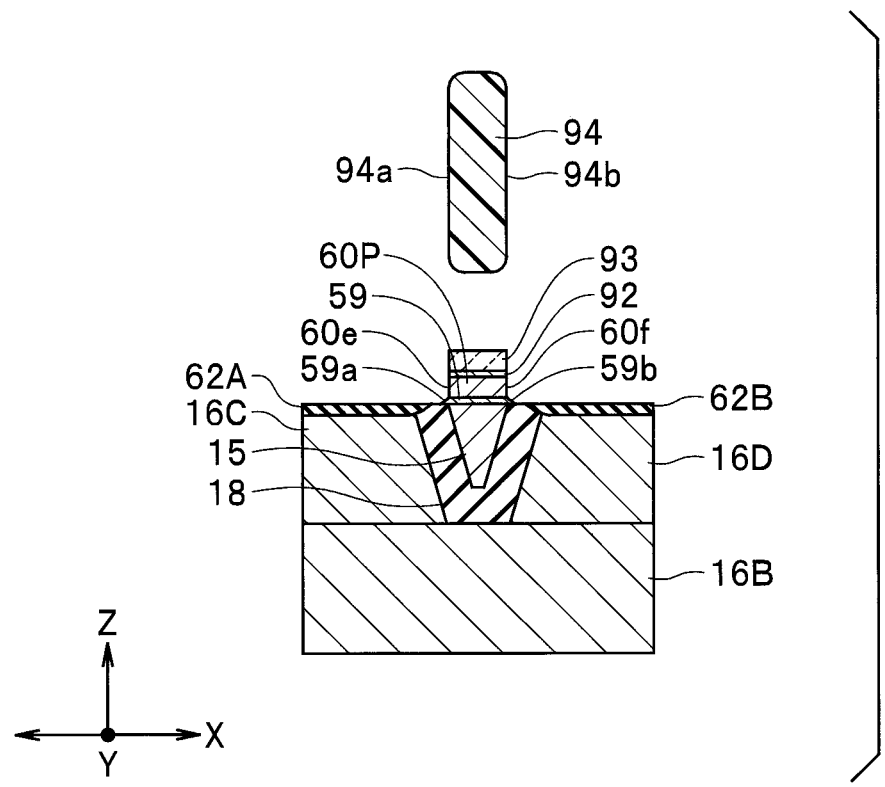
FIG. 22 is a cross-sectional view showing a step that follows the step shown in FIG. 21.

FIG. 22 shows the next step. In this step, like the step shown FIG. 12 according to the first embodiment, the mask 94 is formed on the protective film 93, and part of the protective film 93 is then etched by using the mask 94. Then, the layered film 60P, the initial buffer layer 59P, and the nonmagnetic metal layer 92 are each etched in part by using the mask 94 and the protective layer 93 as etching masks. The etching is performed until the first and second guard films 62A and 62B are exposed. The first and second guard films 62A and 62B function as an etching stopper, and protect the first and second side shields 16C and 16D. The subsequent steps are the same as those in the first embodiment.

As described above, the manufacturing method for the magnetic head 100 according to the present embodiment includes a step of etching the top surface of each of the first and second side shields 16C and 16D between the step of forming the main pole 15 and the first and second side shields 16C and 16D and the step of forming the first and second guard films 62A and 62B. According to the present embodiment, the distance between the trailing shield 16A and the first side shield 16C near the spin torque oscillator 60 and the distance between the trailing shield 16A and the second side shield 16D near the spin torque oscillator 60 can thus be intentionally increased. In the present embodiment, these distances in the medium facing surface 80 are made greater than the distance between the main pole 15 and the trailing shield 16A in the medium facing surface 80.

The other configuration, function and effects of the present embodiment are similar to those of the first embodiment.

Third Embodiment

Figure 23:
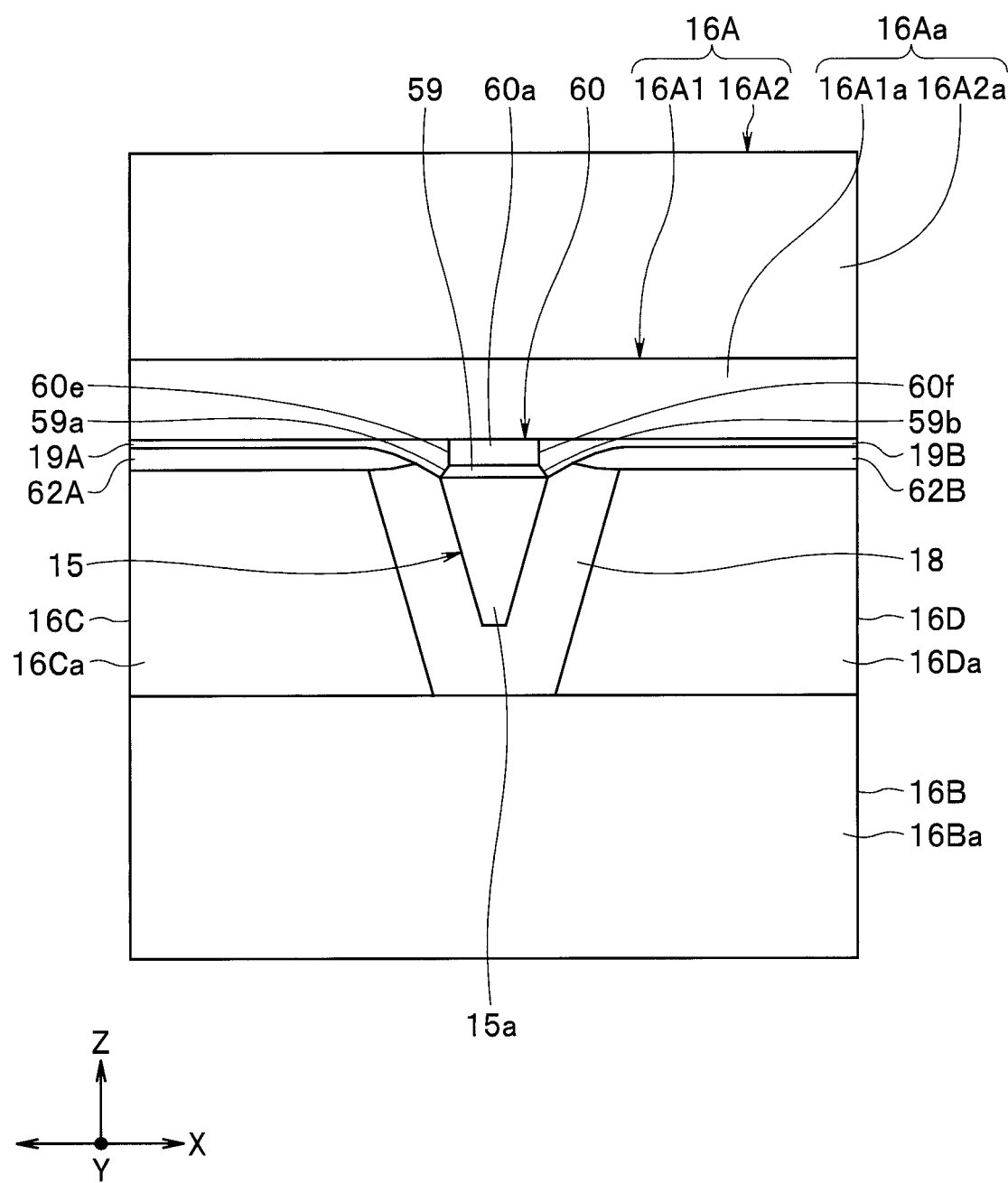
FIG. 23 is a front view showing essential parts of a magnetic head according to a third embodiment of the invention.

Next, a third embodiment of the invention will be described. Reference is first made to FIG. 23 to describe differences of the magnetic head 100 according to the present embodiment from that according to the second embodiment. FIG. 23 is a front view showing essential parts of the magnetic head 100 according to the present embodiment.

In the present embodiment, the distance between the main pole 15 and the trailing shield 16A in the medium facing surface 80 is different from that in the second embodiment. Near the spin torque oscillator 60, the distance between the main pole 15 and the trailing shield 16A in the medium facing surface 80 is greater than each of the distance between the trailing shield 16A and the first side shield 16C in the medium facing surface 80 and the distance between the trailing shield 16A and the second side shield 16D in the medium facing surface 80. In other words, near the spin torque oscillator 60, the distance between the trailing shield 16A and the first side shield 16C in the medium facing surface 80 and the distance between the trailing shield 16A and the second side shield 16D in the medium facing surface 80 are each smaller than the distance between the main pole 15 and the trailing shield 16A in the medium facing surface 80.

Next, a manufacturing method for the magnetic head 100 according to the present embodiment will be described with reference to FIG. 24 to FIG. 27. FIG. 24 to FIG. 27 each show a stack of layers formed in the process of manufacturing the magnetic head 100 according to the present embodiment. FIG. 24 to FIG. 27 omit the illustration of portions that are closer to the substrate 1 (see FIG. 5 and FIG. 6) relative to the leading shield 16B. FIG. 24 to FIG. 27 each show a cross section of the stack taken at the position where the medium facing surface 80 is to be formed.

Figure 24:
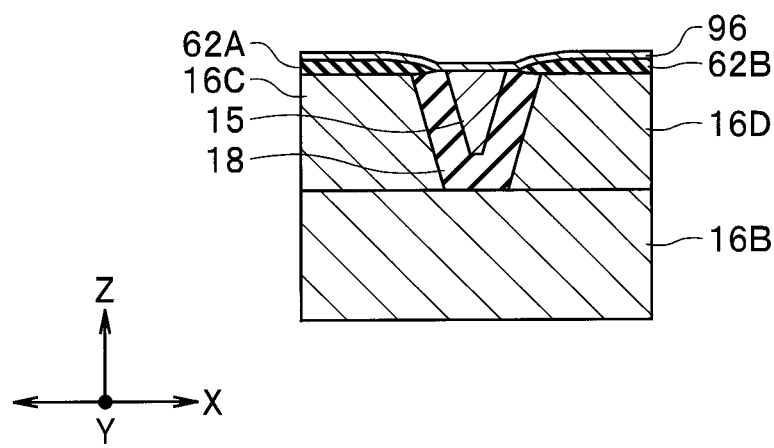
FIG. 24 is a cross-sectional view showing a step of a manufacturing method for the magnetic head according to the third embodiment of the invention.

The manufacturing method for the magnetic head 100 according to the present embodiment is similar to that of the second embodiment up to the step of forming the first and second guard films 62A and 62B. FIG. 24 shows a step that follows the formation of the first and second guard films 62A and 62B. In this step, a nonmagnetic metal layer 96 of Ta or Cr is formed over the entire top surface of the stack.

Figure 25:
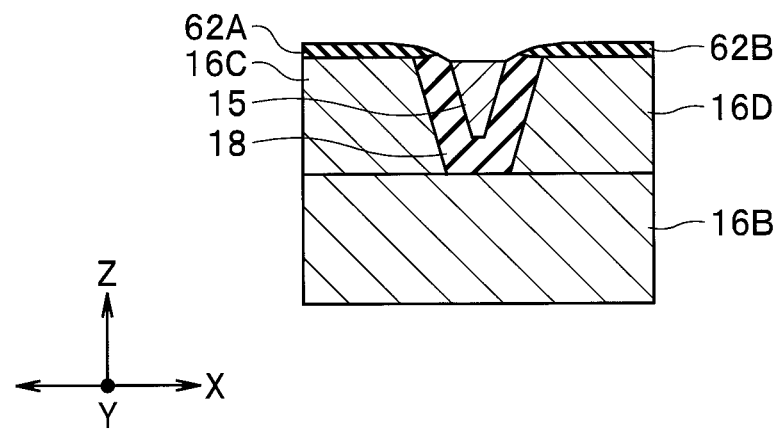
FIG. 25 is a cross-sectional view showing a step that follows the step shown in FIG. 24.

FIG. 25 shows the next step. In this step, the nonmagnetic metal layer 96 is removed and the top surface 15T of the main pole 15 is etched by, e.g., IBE until the top surface 15T of the main pole 15 near the position where the medium facing surface 80 is to be formed reaches a desired position. The etching is performed until the top surface 15T of the main pole 15 reaches a position closer to the top surface 1a of the substrate 1 than to the top surface of each of the first and second side shields 16C and 16D. During the etching, the first and second side shields 16C and 16D are protected by the first and second guard films 62A and 62B.

Figure 26:
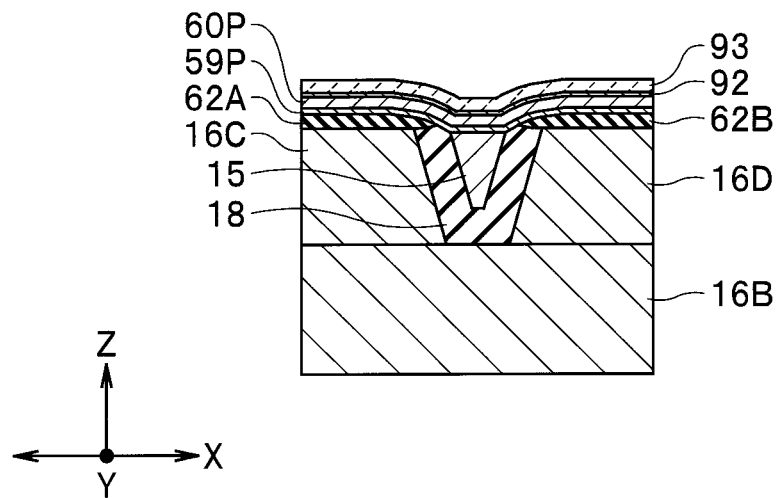
FIG. 26 is a cross-sectional view showing a step that follows the step shown in FIG. 25.

FIG. 26 shows the next step. In this step, like the step shown in FIG. 21 according to the second embodiment, the initial buffer layer 59P, the layered film 60P, the nonmagnetic metal layer 92, and the protective layer 93 are formed in this order on the stack.

Figure 27:
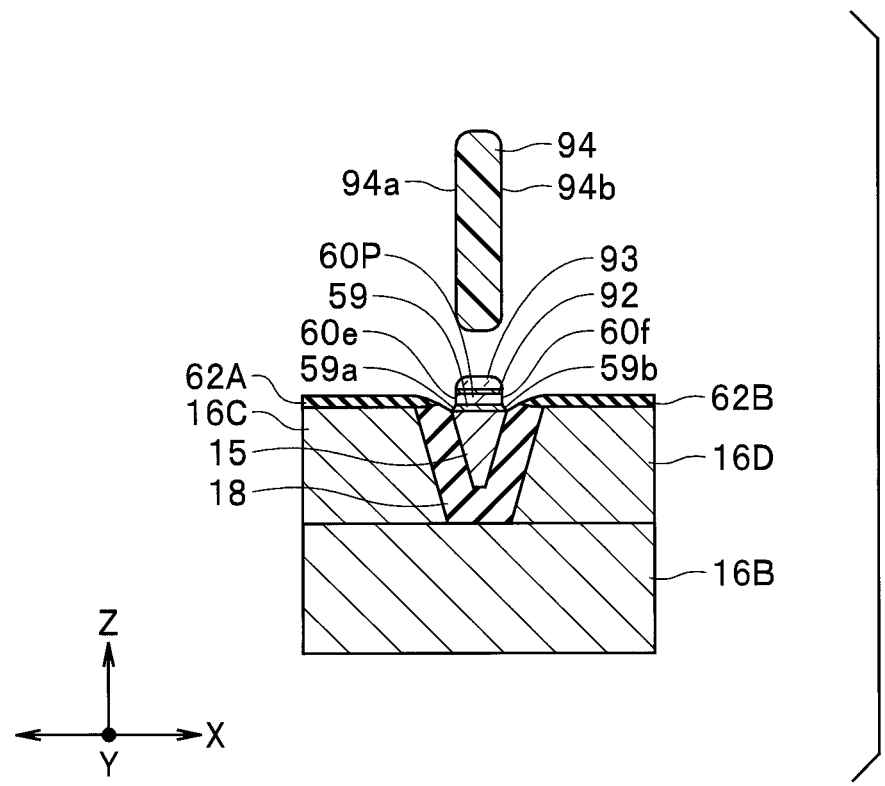
FIG. 27 is a cross-sectional view showing a step that follows the step shown in FIG. 26.

FIG. 27 shows the next step. In this step, like the step shown FIG. 22 according to the second embodiment, the mask 94 is formed on the protective film 93, and part of the protective layer 93 is then etched by using the mask 94. Then, the layered film 60P, the initial buffer layer 59P, and the nonmagnetic metal layer 92 are each etched in part by using the mask 94 and the protective layer 93 as etching masks. The etching is performed until the first and second guard films 62A and 62B are exposed. The first and second guard films 62A and 62B function as an etching stopper, and protect the first and second side shields 16C and 16D. The subsequent steps are the same as those in the second embodiment.

As described above, the manufacturing method for the magnetic head 100 according to the present embodiment includes a step of etching the top surface 15T of the main pole 15 between the step of forming the first and second guard films 62A and 62B and the step of forming the layered film 60P. According to the present embodiment, the distance between the main pole 15 and the trailing shield 16A can thus be intentionally increased to make the distance between the trailing shield 16A and the first side shield 16C near the spin torque oscillator 60 and the distance between the trailing shield 16A and the second side shield 16D near the spin torque oscillator 60 relatively small. In the present embodiment, these distances in the medium facing surface 80 are made smaller than the distance between the main pole 15 and the trailing shield 16A in the medium facing surface 80.

The other configuration, function and effects of the present embodiment are similar to those of the second embodiment.

Fourth Embodiment

Figure 28:
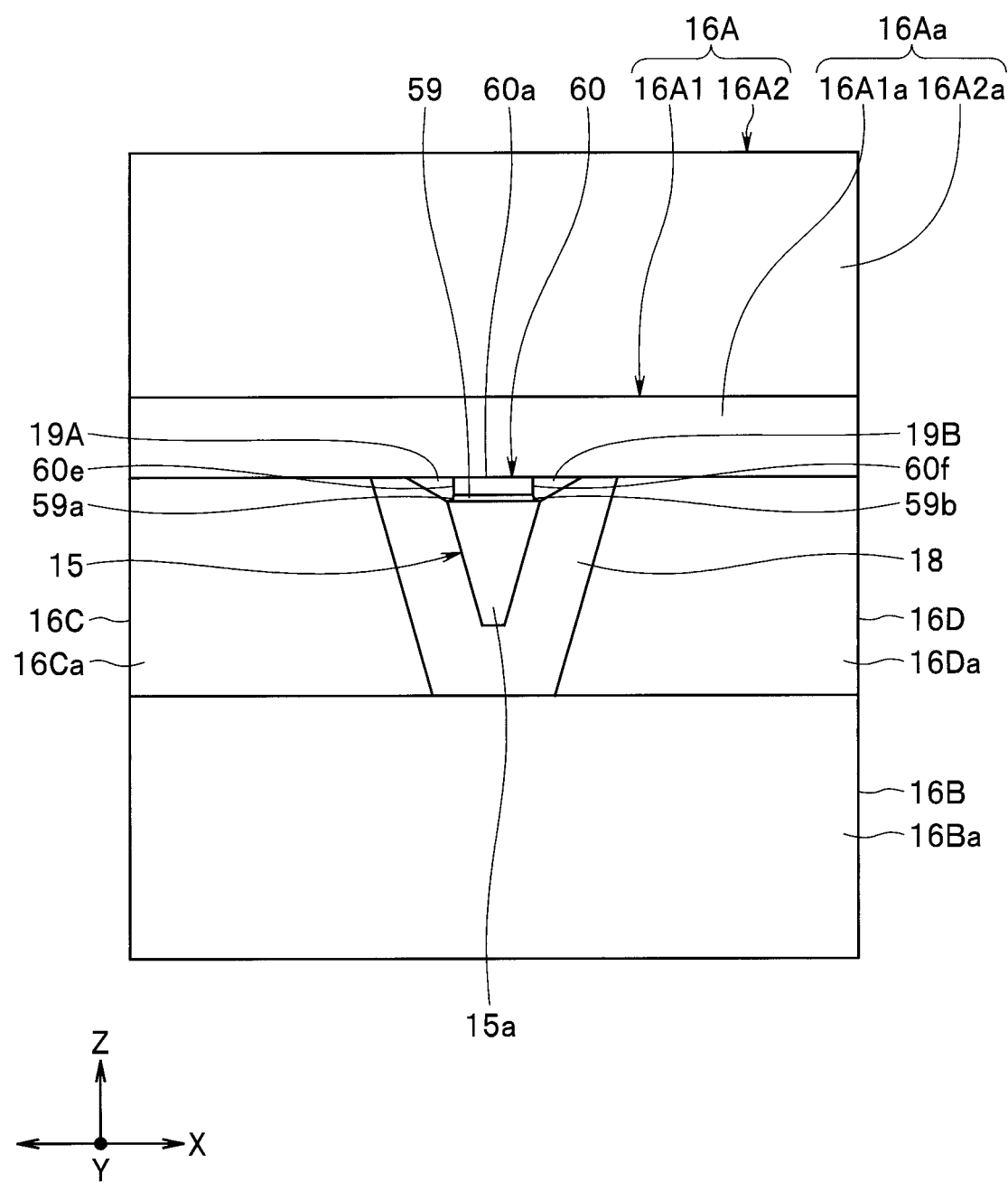
FIG. 28 is a front view showing essential parts of a magnetic head according to a fourth embodiment of the invention.

Next, a fourth embodiment of the invention will be described. Reference is first made to FIG. 28 to describe differences of the magnetic head 100 according to the present embodiment from that according to the first embodiment. FIG. 28 is a front view showing essential parts of the magnetic head 100 according to the present embodiment.

In the present embodiment, the first and second guard films 62A and 62B of the first embodiment are not included. The first gap film 19A is interposed not between the trailing shield 16A and the first side shield 16C but between the trailing shield 16A and the first gap layer 18. The second gap film 19B is interposed not between the trailing shield 16A and the second side shield 16D but between the trailing shield 16A and the first gap layer 18.

Next, a manufacturing method for the magnetic head 100 according to the present embodiment will be described with reference to FIG. 29 to FIG. 34. FIG. 29 to FIG. 34 each show a stack of layers formed in the process of manufacturing the magnetic head 100 according to the present embodiment. FIG. 29 to FIG. 34 omit the illustration of portions that are closer to the substrate 1 (see FIG. 5 and FIG. 6) relative to the leading shield 16B. FIG. 29 to FIG. 34 each show a cross section of the stack taken at the position where the medium facing surface 80 is to be formed.

Figure 29:
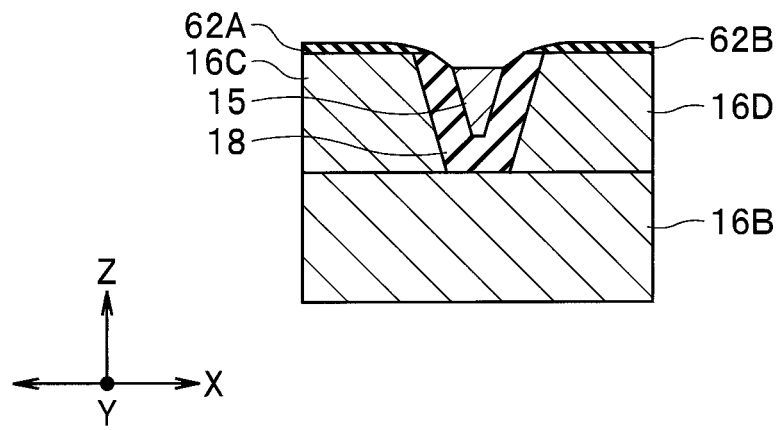
FIG. 29 is a cross-sectional view showing a step of a manufacturing method for the magnetic head according to the fourth embodiment of the invention.

The manufacturing method for the magnetic head 100 according to the present embodiment is similar to that of the first embodiment up to the step of forming the first and second guard films 62A and 62B. FIG. 29 shows a step that follows the formation of the first and second guard films 62A and 62B. In this step, the top surface 15T of the main pole 15 is etched by, e.g., IBE until the top surface 15T of the main pole 15 near the position where the medium facing surface 80 is to be formed reaches a desired position. During the etching, the first and second side shields 16C and 16D are protected by the first and second guard films 62A and 62B.

Figure 30:
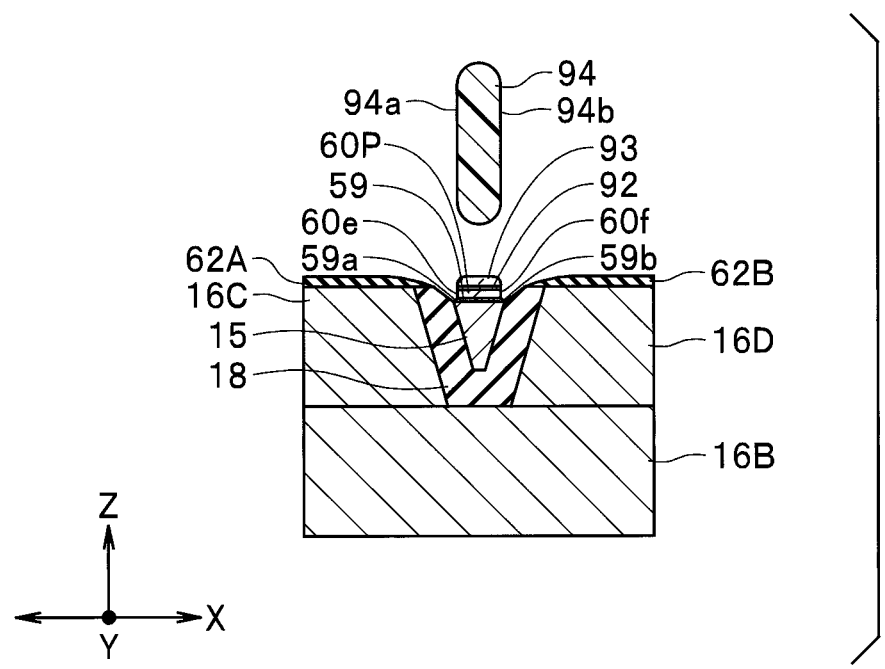
FIG. 30 is a cross-sectional view showing a step that follows the step shown in FIG. 29.

FIG. 30 shows the next step. In this step, like the step shown in FIG. 11 and FIG. 12 according to the first embodiment, the initial buffer layer 59P, the layered film 60P, the nonmagnetic metal layer 92, the protective layer 93, and the mask 94 are formed in this order on the stack, and part of the protective film 93 is then etched by using the mask 94. Then, the layered film 60P, the initial buffer layer 59P, and the nonmagnetic metal layer 92 are each etched in part by using the mask 94 and the protective layer 93 as etching masks. The etching is performed until the first and second guard films 62A and 62B are exposed. The first and second guard films 62A and 62B function as an etching stopper, and protect the first and second side shields 16C and 16D.

Figure 31:
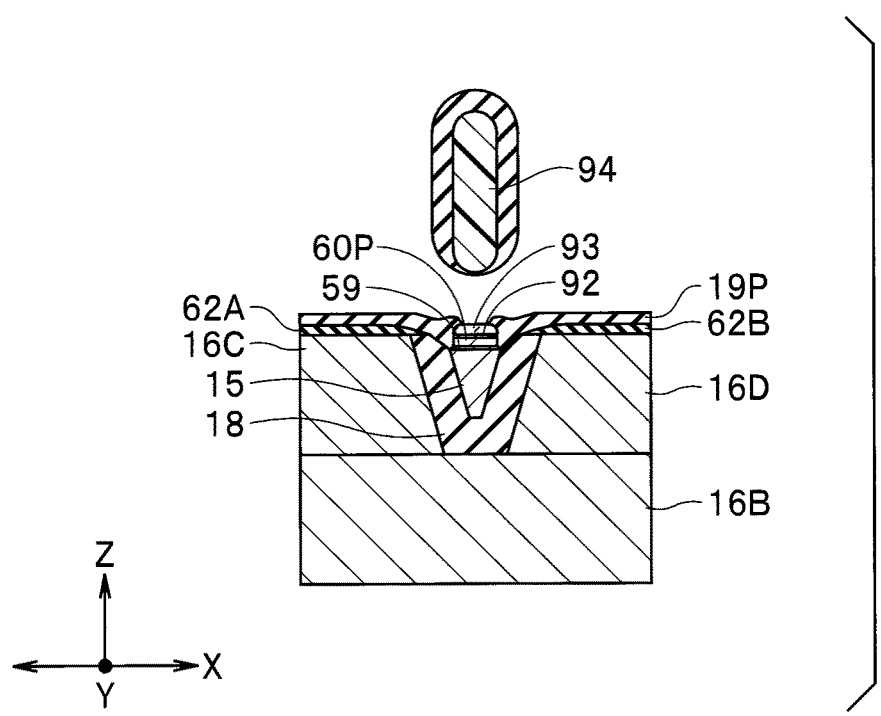
FIG. 31 is a cross-sectional view showing a step that follows the step shown in FIG. 30.

FIG. 31 shows the next step. In this step, a nonmagnetic film 19P of a nonmagnetic material is formed over the entire top surface of the stack by, e.g., ion beam deposition with the mask 94 left unremoved. Next, the nonmagnetic film 19P is etched to planarize the top surface of the nonmagnetic film 19P by IBE, for example.

Figure 32:
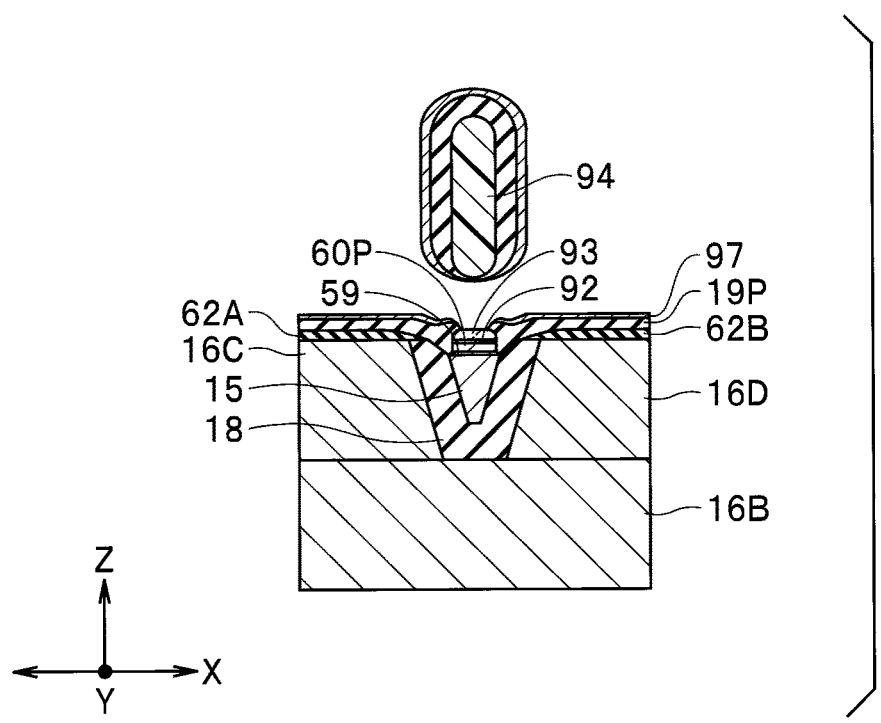
FIG. 32 is a cross-sectional view showing a step that follows the step shown in FIG. 31.

FIG. 32 shows the next step. In this step, a nonmagnetic metal layer 97 of Ru is formed over the entire top surface of the stack with the mask 94 left unremoved.

Figure 33:
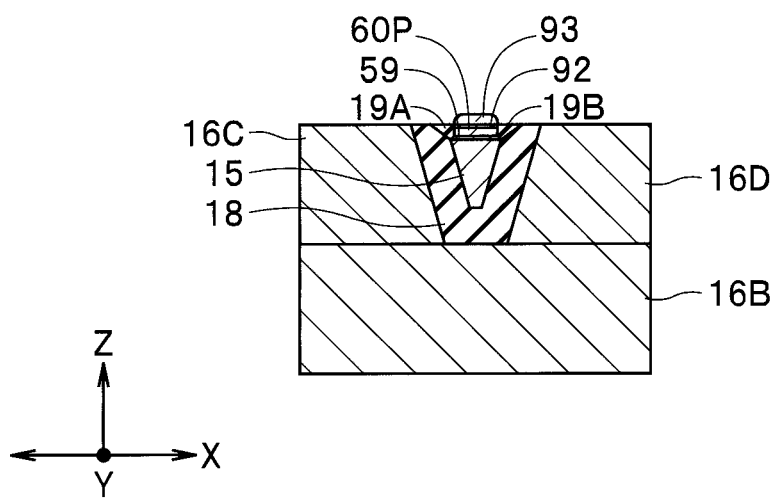
FIG. 33 is a cross-sectional view showing a step that follows the step shown in FIG. 32.

FIG. 33 shows the next step. In this step, the mask 94 is initially lifted up. Next, needless portions of the nonmagnetic film 19P on the protective layer 93 are removed by wet etching, for example. The nonmagnetic film 19P, the first and second guard films 62A and 62B, and the nonmagnetic metal layer 97 are then etched by IBE, for example. The etching is performed until the top surfaces of the first and second side shields 16C and 16D are exposed. The first and second guard films 62A and 62B and the nonmagnetic metal layer 97 are removed by the etching. The portions of the nonmagnetic film 19P left unetched make the first and second gap films 19A and 19B.

Figure 34:
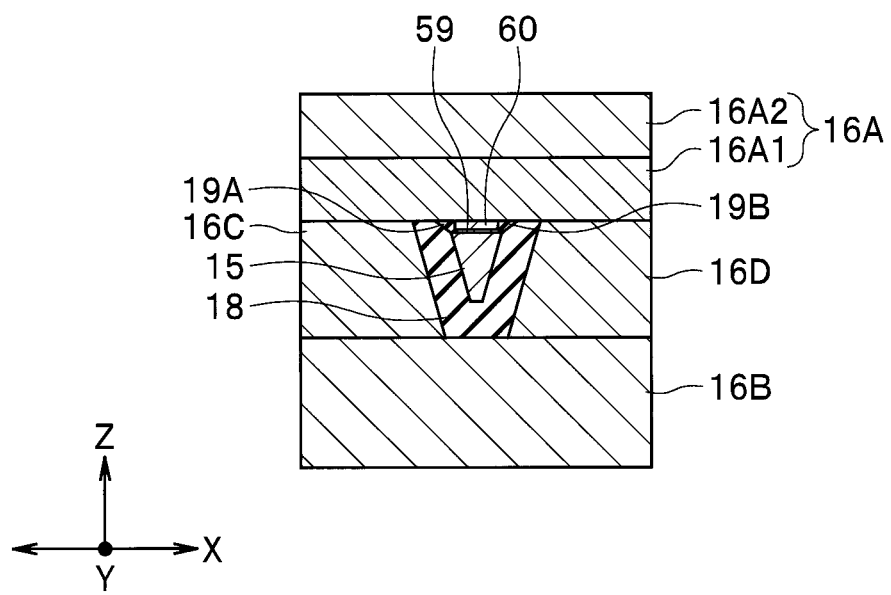
FIG. 34 is a cross-sectional view showing a step that follows the step shown in FIG. 33.

FIG. 34 shows the next step. The step shown in FIG. 34 is similar to the step shown in FIG. 17 according to the first embodiment. The step shown in FIG. 34 includes an etching step (hereinafter, referred to as a second etching step) of etching another part of the layered film 60P so that the layered film 60P makes the spin torque oscillator 60, and a step of forming the trailing shield 16A. The spin torque oscillator 60 and the trailing shield 16A are completed by the step shown in FIG. 34. The subsequent steps are the same as those in the first embodiment.

As described above, the manufacturing method for the magnetic head 100 according to the present embodiment includes a step of removing the first and second guard films 62A and 62B between the step of forming the first and second gap films 19A and 19B and the second etching step. In the present embodiment, the first and second guard films 62A and 62B are formed in the process of manufacturing the magnetic head 100, but the first and second guard films 62A and 62B are not included in the completed magnetic head 100. The first and second guard films 62A and 62B protect the first and second side shields 16C and 16D in etching the top surface 15T of the main pole 15.

In the present embodiment, the nonmagnetic material constituting the first and second gap films 19A and 19B may be a nonmagnetic insulating material such as alumina, or a nonmagnetic metal material such as Ru. The first and second gap films 19A and 19B are in contact with the spin torque oscillator 60. If the first and second gap films 19A and 19B are formed of a nonmagnetic metal material, the first and second gap films 19A and 19B therefore function as a heat sink for dissipating heat generated by the spin torque oscillator 60 to outside the spin torque oscillator 60. This can suppress an increase in the temperature of the spin torque oscillator 60.

The other configuration, function and effects of the present embodiment are similar to those of the first embodiment.

The present invention is not limited to the foregoing embodiments, and various modifications may be made thereto. As long as the requirements of the appended claims are met, the shape and layout of each of the spin torque oscillator 60 and the buffer layer 59 are not limited to the examples illustrated in the foregoing embodiments but can be freely chosen. For example, the front end face 60a of the spin torque oscillator 60 may be located away from the medium facing surface 80. Each of the first and second side surfaces 60e and 60f of the spin torque oscillator 60 may be, at least in part, a tapered surface tilted from the direction perpendicular to the top surface 1a of the substrate 1.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head comprising:
   a medium facing surface configured to face a recording medium;
   a main pole configured to generate a write magnetic field for writing data on the recording medium;
   a trailing shield formed of a magnetic material and located forward relative to the main pole in a direction of travel of the recording medium;
   a spin torque oscillator located between the main pole and the trailing shield and electrically connected to the main pole and the trailing shield;
   first and second side shields formed of a magnetic material and opposed to each other in a track width direction with the main pole between the first and second side shields;
   first and second gap films formed of a nonmagnetic material and opposed to each other in the track width direction with the spin torque oscillator between the first and second gap films, the first and second gap films being in contact with the spin torque oscillator; and
   first and second guard films formed of a nonmagnetic material, wherein
   the first gap film and the first guard film are interposed between the trailing shield and the first side shield,
   the first guard film is interposed between the first gap film and the first side shield,
   the second gap film and the second guard film are interposed between the trailing shield and the second side shield,
   the second guard film is interposed between the second gap film and the second side shield, and
   the first and second guard films are not in contact with the spin torque generator oscillator.

2. The magnetic head according to claim 1, wherein a distance between the trailing shield and the first side shield in the medium facing surface and a distance between the trailing shield and the second side shield in the medium facing surface are each the same as a distance between the main pole and the trailing shield in the medium facing surface.

3. The magnetic head according to claim 1, wherein a distance between the trailing shield and the first side shield in the medium facing surface and a distance between the trailing shield and the second side shield in the medium facing surface are each greater than a distance between the main pole and the trailing shield in the medium facing surface.

4. The magnetic head according to claim 1, wherein a distance between the trailing shield and the first side shield in the medium facing surface and a distance between the trailing shield and the second side shield in the medium facing surface are each smaller than a distance between the main pole and the trailing shield in the medium facing surface.

5. The magnetic head according to claim 1, wherein the first and second guard films are formed of a nonmagnetic insulating material or a nonmagnetic metal material.

6. A manufacturing method for a magnetic head,
   the magnetic head including:
   a medium facing surface configured to face a recording medium;
   a main pole configured to generate a write magnetic field for writing data on the recording medium;
   a trailing shield formed of a magnetic material and located forward relative to the main pole in a direction of travel of the recording medium;
   a spin torque oscillator located between the main pole and the trailing shield and electrically connected to the main pole and the trailing shield;
   first and second side shields formed of a magnetic material and opposed to each other in a track width direction with the main pole between the first and second side shields;
   first and second gap films formed of a nonmagnetic material and opposed to each other in the track width direction with the spin torque oscillator between the first and second gap films, the first and second gap films being in contact with the spin torque oscillator; and
   first and second guard films formed of a nonmagnetic material, wherein
   the first gap film and the first guard film are interposed between the trailing shield and the first side shield,
   the first guard film is interposed between the first gap film and the first side shield,
   the second gap film and the second guard film are interposed between the trailing shield and the second side shield, the second guard film is interposed between the second gap film and the second side shield, and the first and second guard films are not in contact with the spin torque oscillator, the manufacturing method comprising:

a step of forming the main pole and the first and second side shields;

a step of forming the first and second guard films of a nonmagnetic material on the first and second side shields;

a step of forming a layered film to later become the spin torque oscillator on the main pole and the first and second guard films;

a first etching step of etching a part of the layered film until the first and second guard films are exposed;

a step of forming the first and second gap films after the first etching step;

a second etching step of etching another part of the layered film so that the layered film becomes the spin torque oscillator after the step of forming the first and second gap films; and a step of forming the trailing shield on the spin torque oscillator, the first and second side shields, and the first and second gap films.

7. The manufacturing method for a magnetic head according to claim 6, further comprising a step of etching a top surface of each of the first and second side shields between the step of forming the main pole and the first and second side shields and the step of forming the first and second guard films.

8. The manufacturing method for a magnetic head according to claim 6, further comprising a step of etching a top surface of the main pole between the step of forming the first and second guard films and the step of forming the layered film.

* * * * *